July 23, 1929.  L. G. HAHN  1,721,623
METHOD AND MACHINE FOR MAKING ARMATURE CONDUCTORS
Original Filed April 5, 1923  22 Sheets-Sheet 15
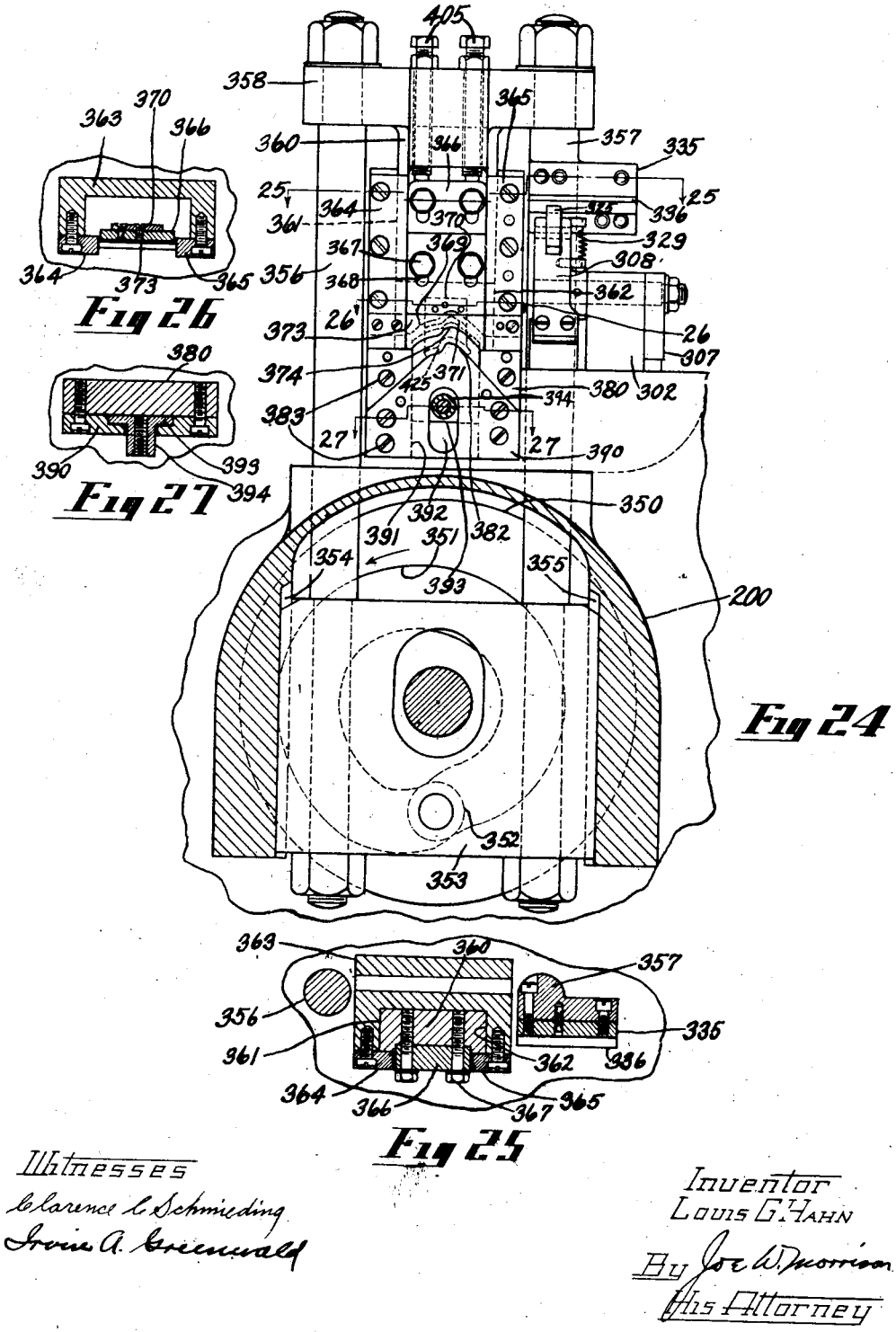

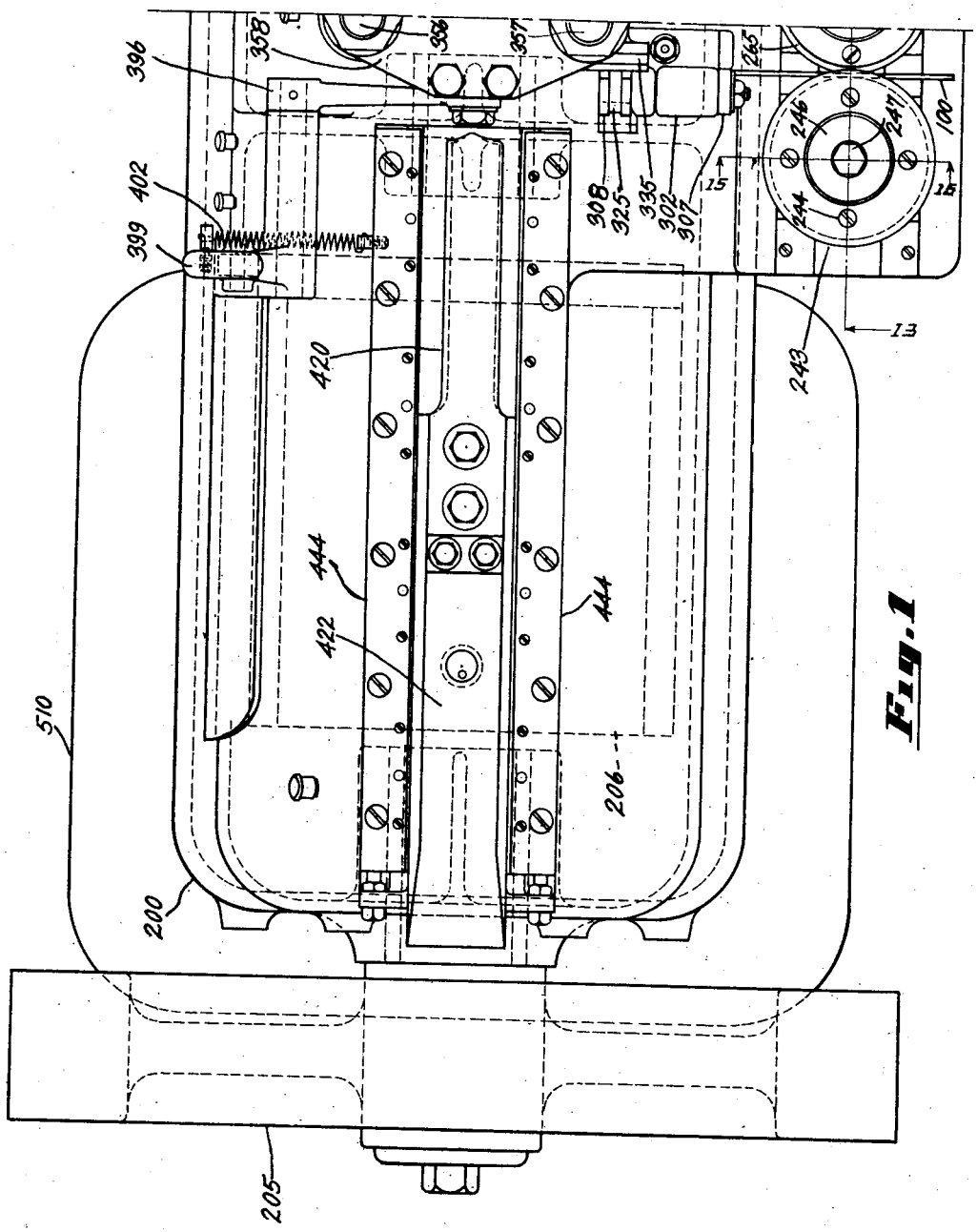

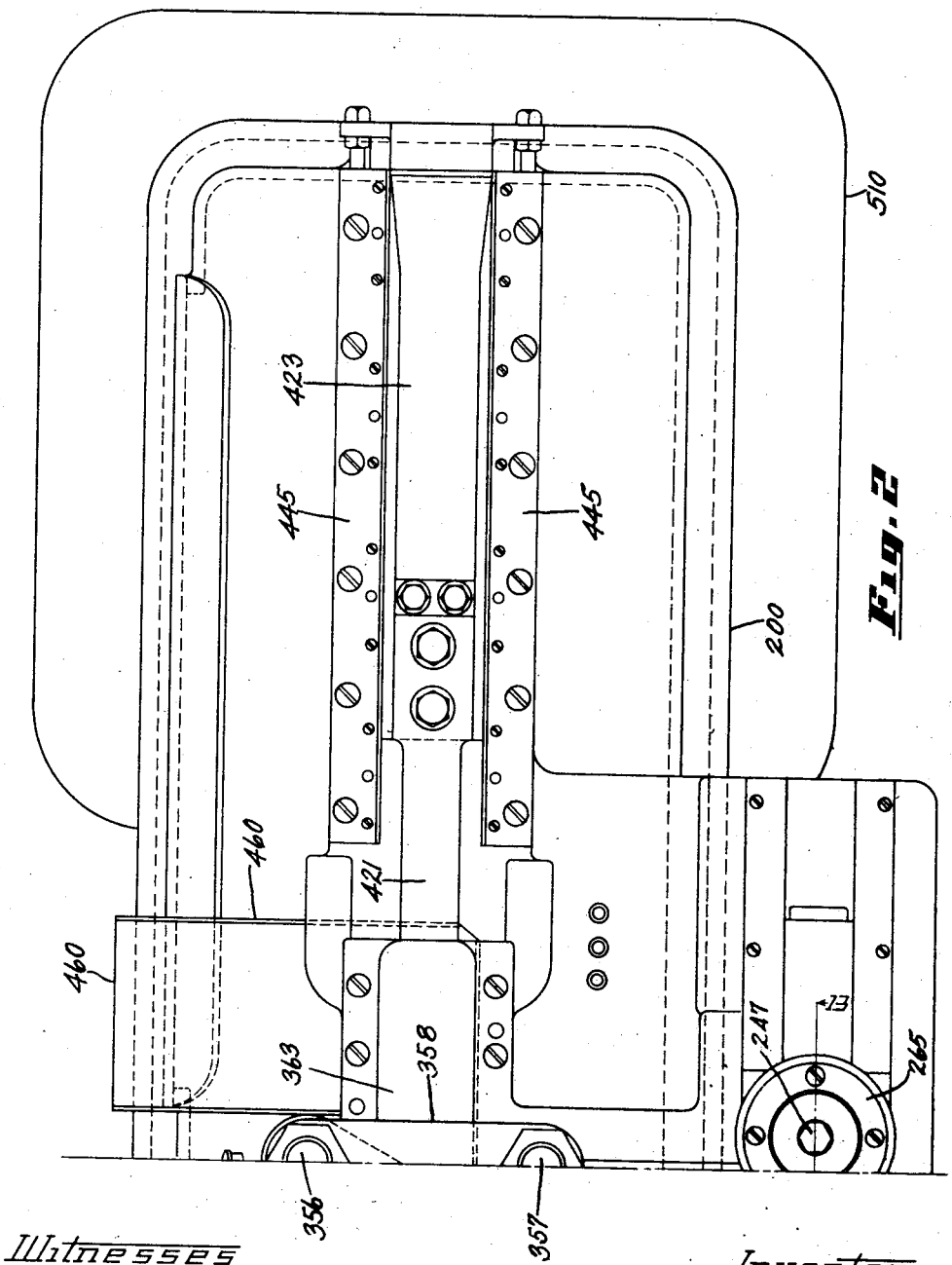

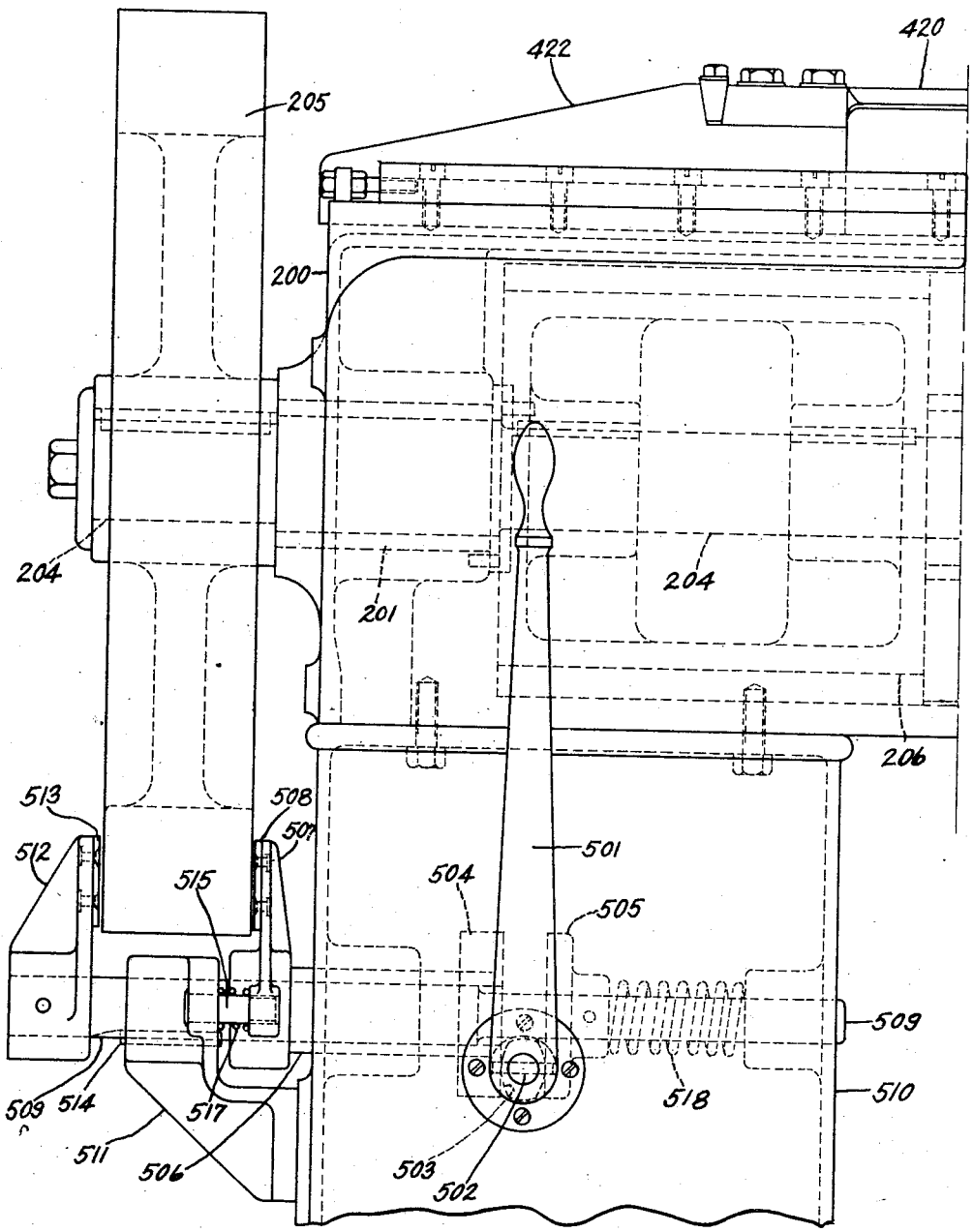

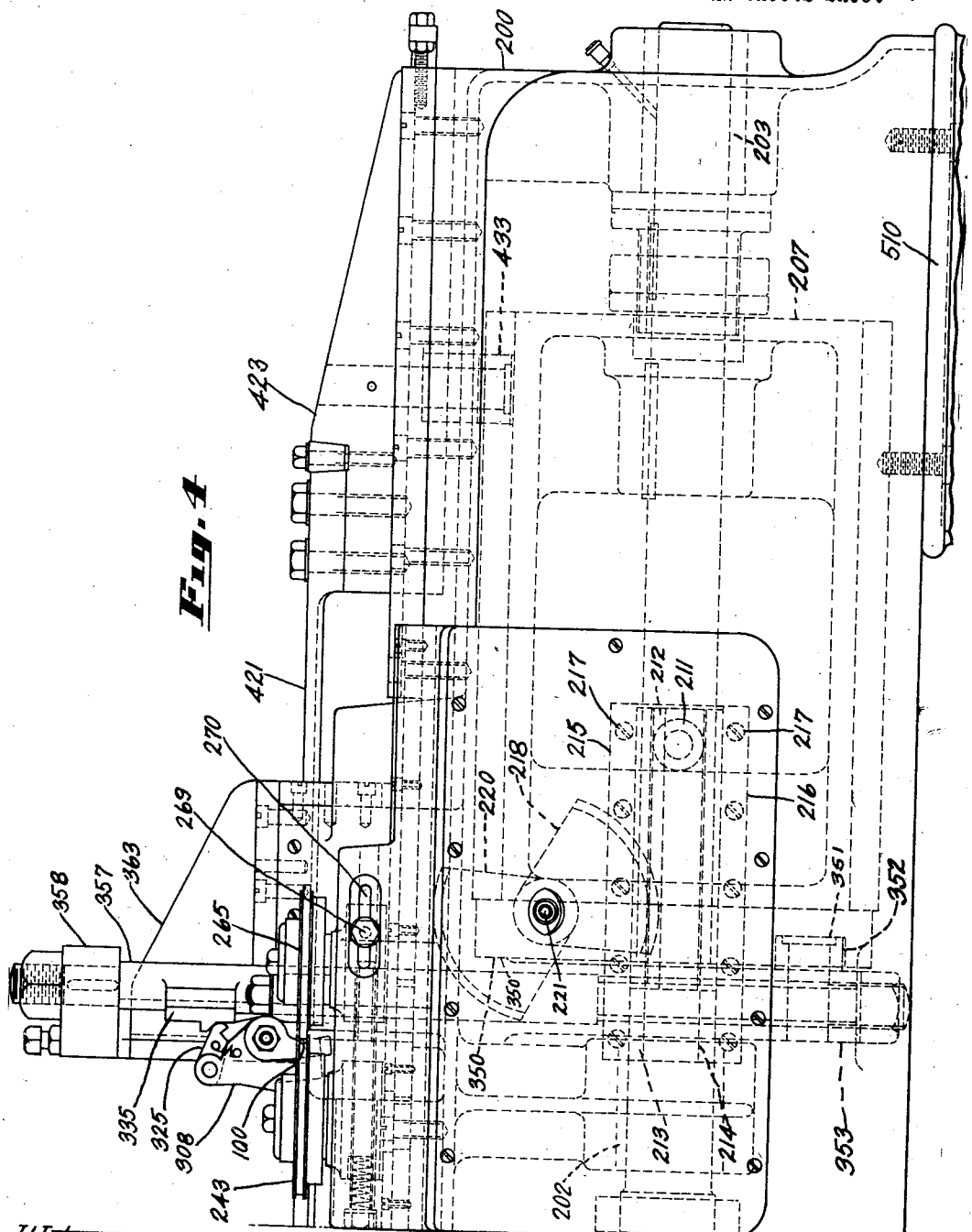

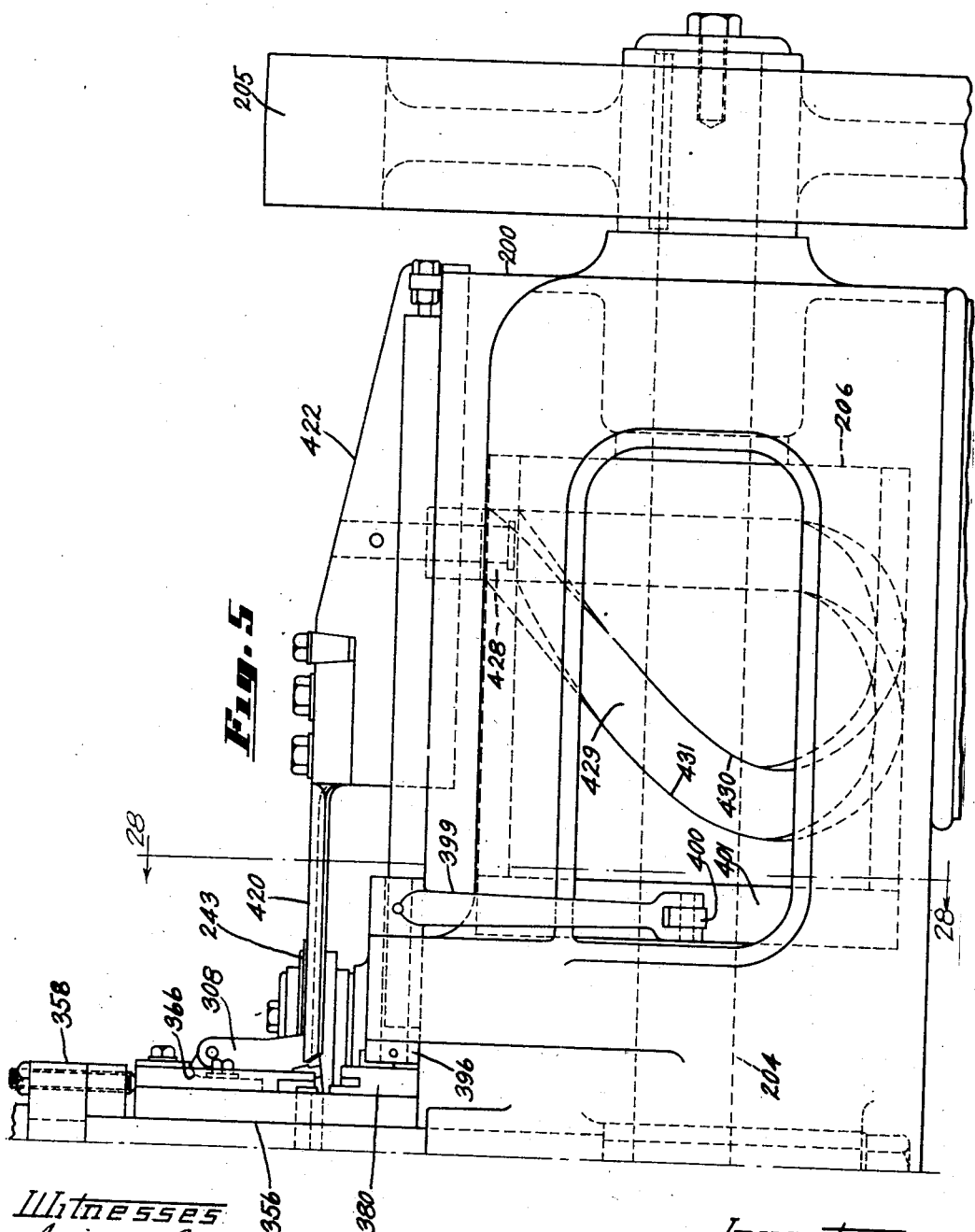

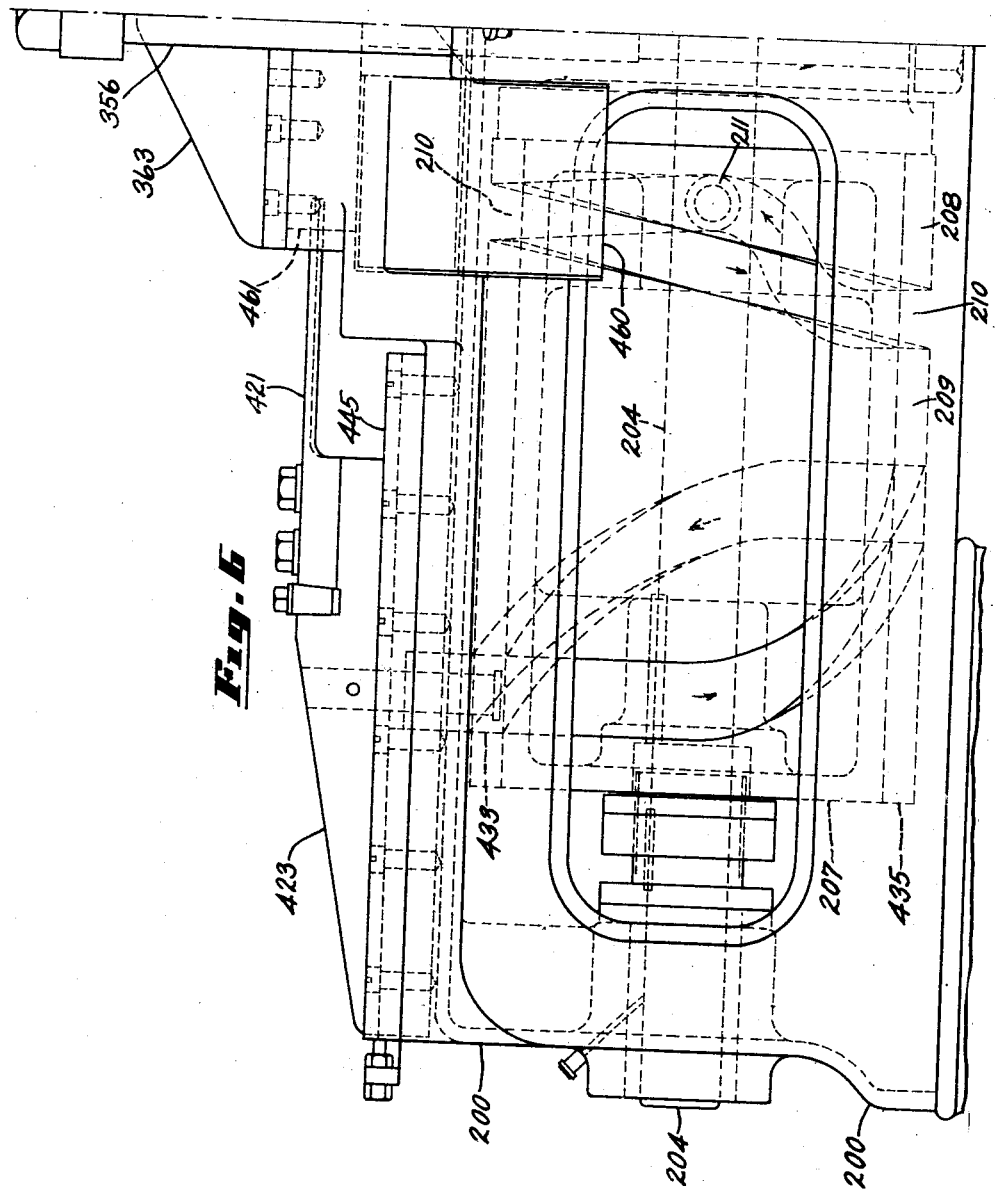

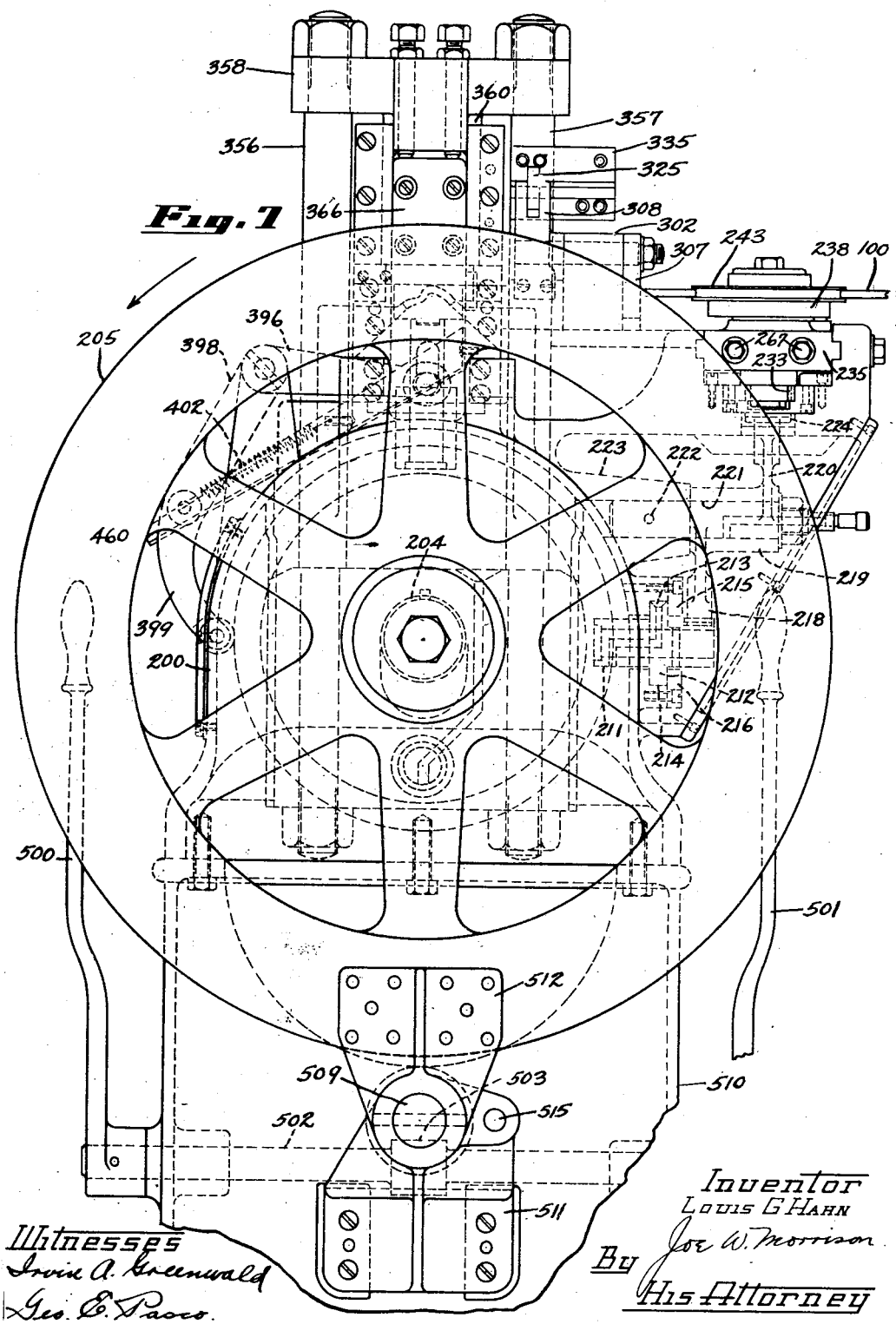

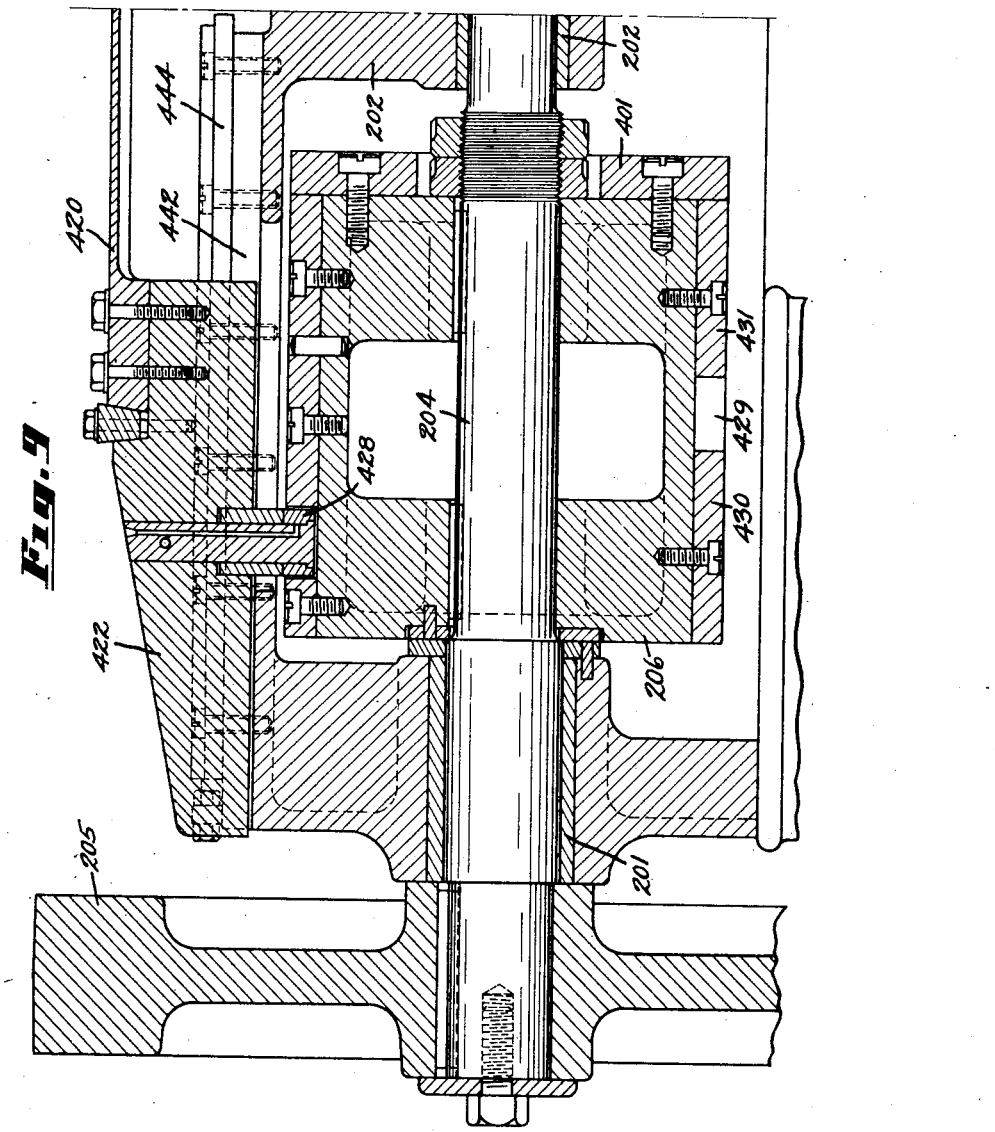

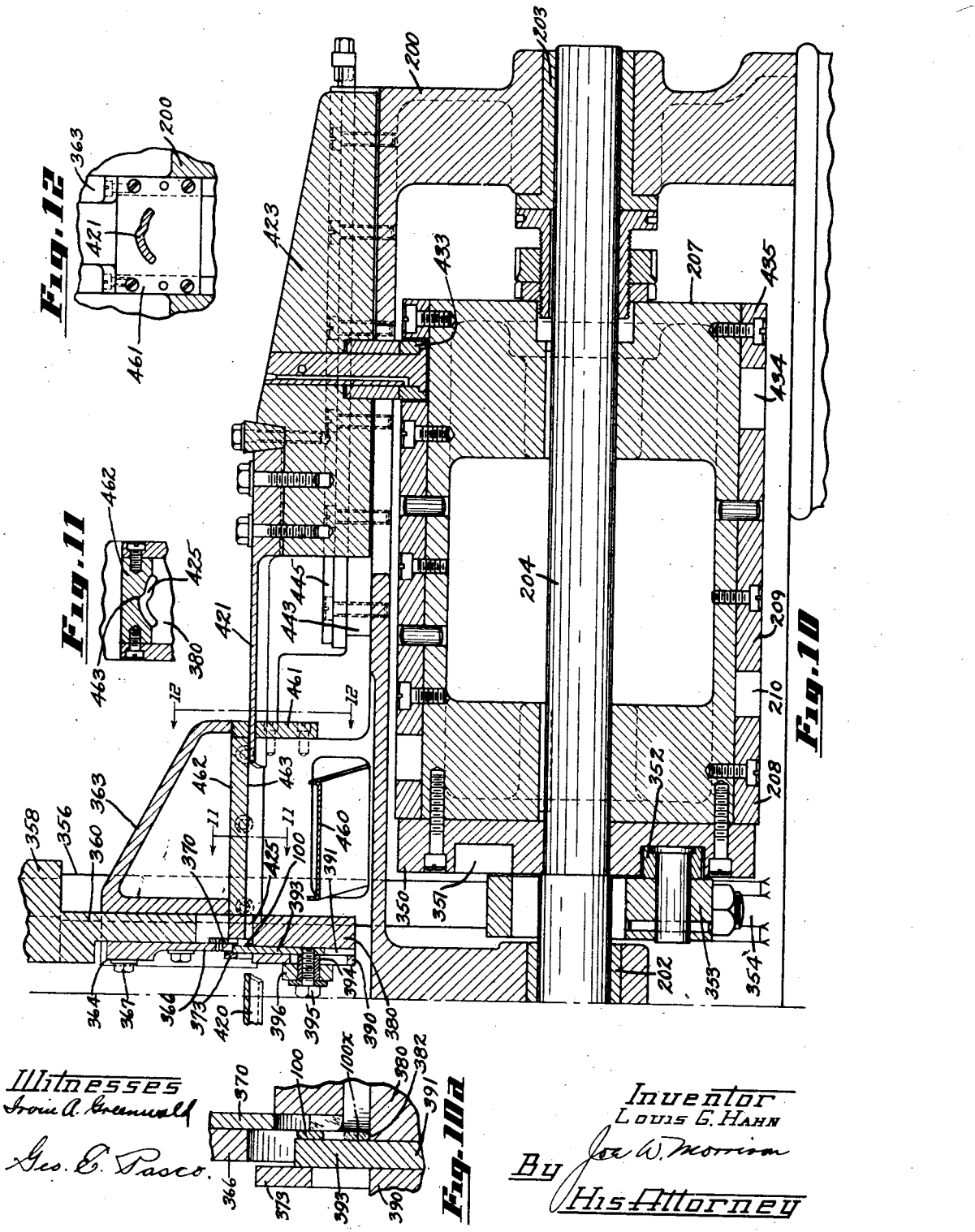

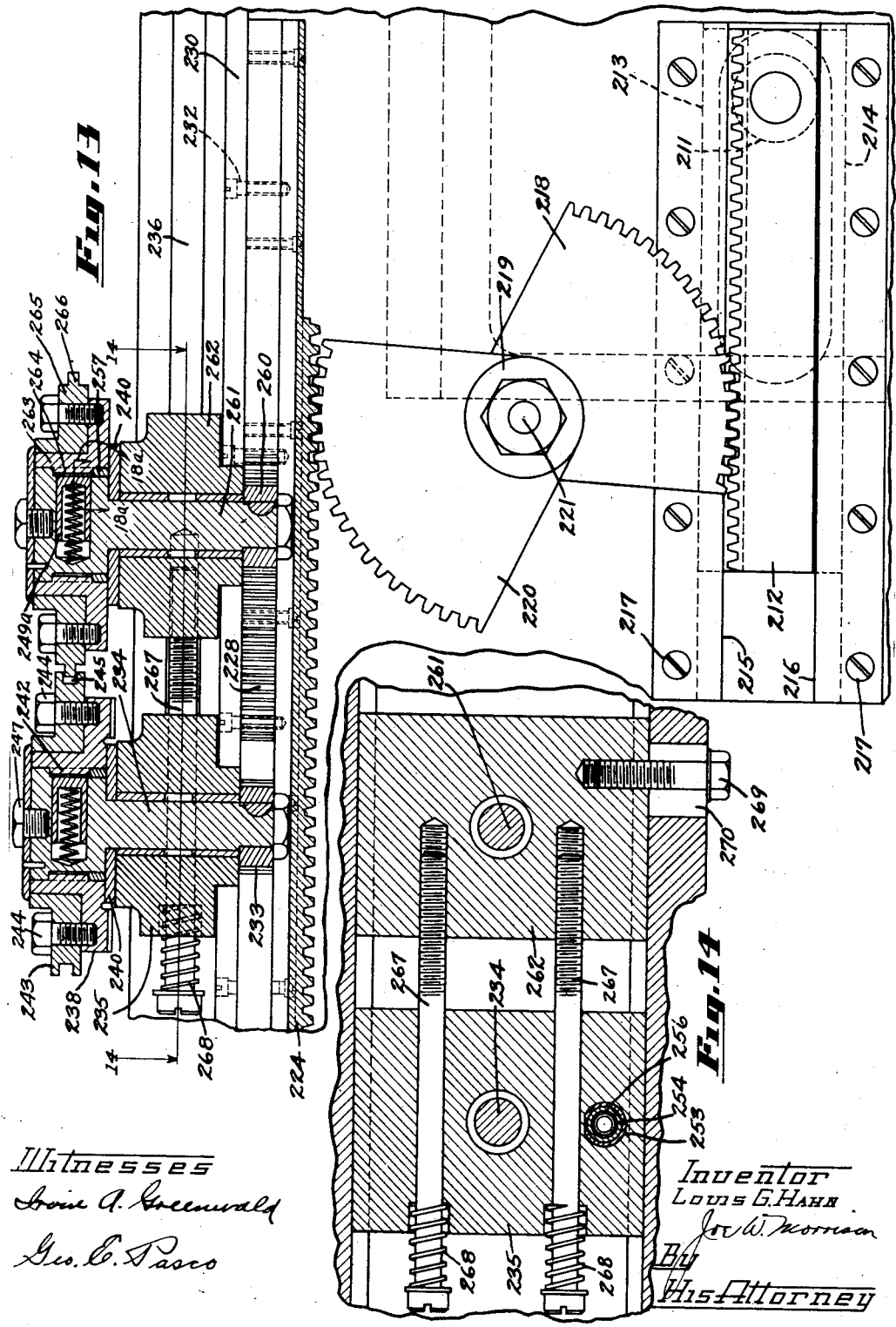

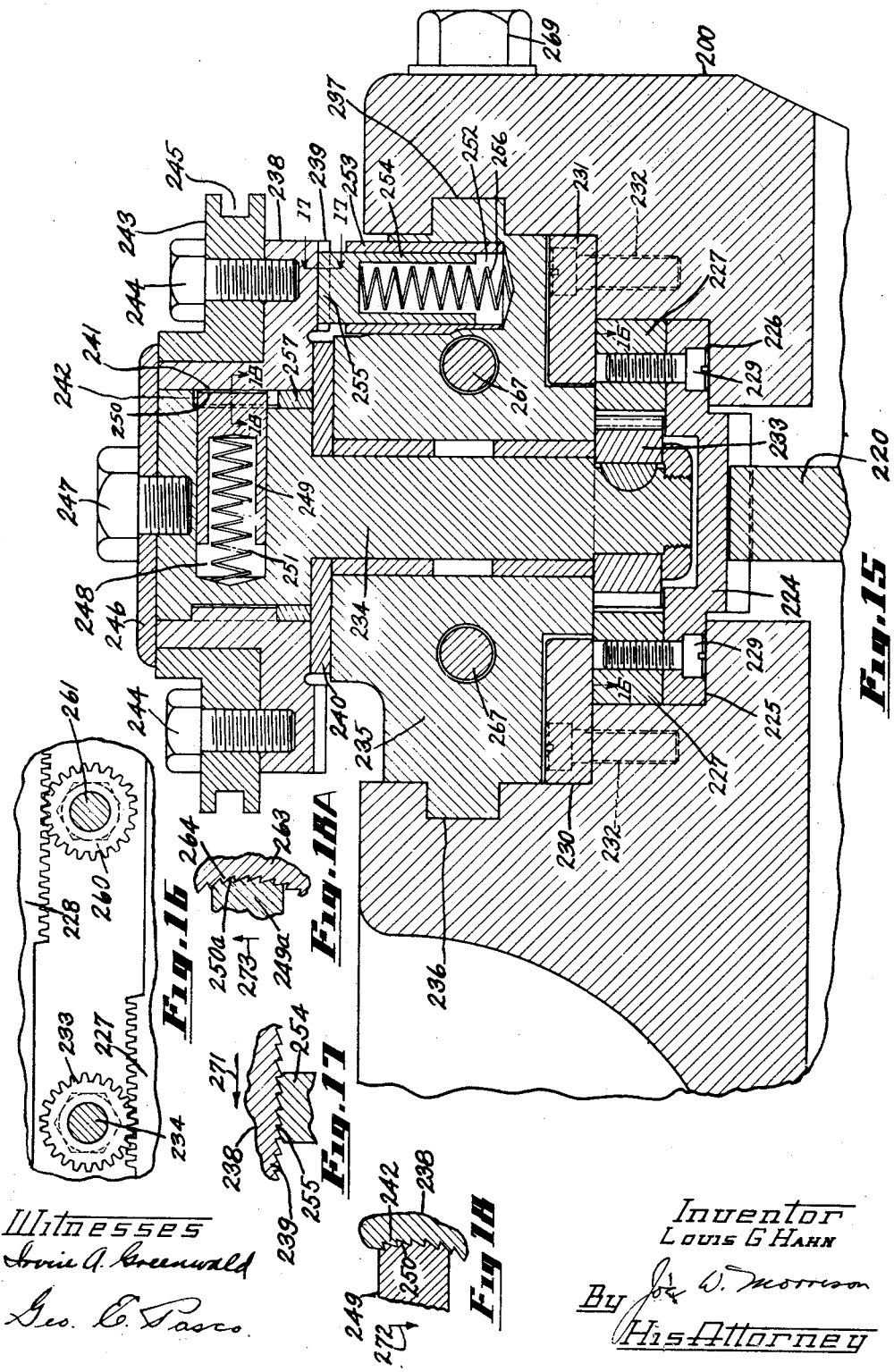

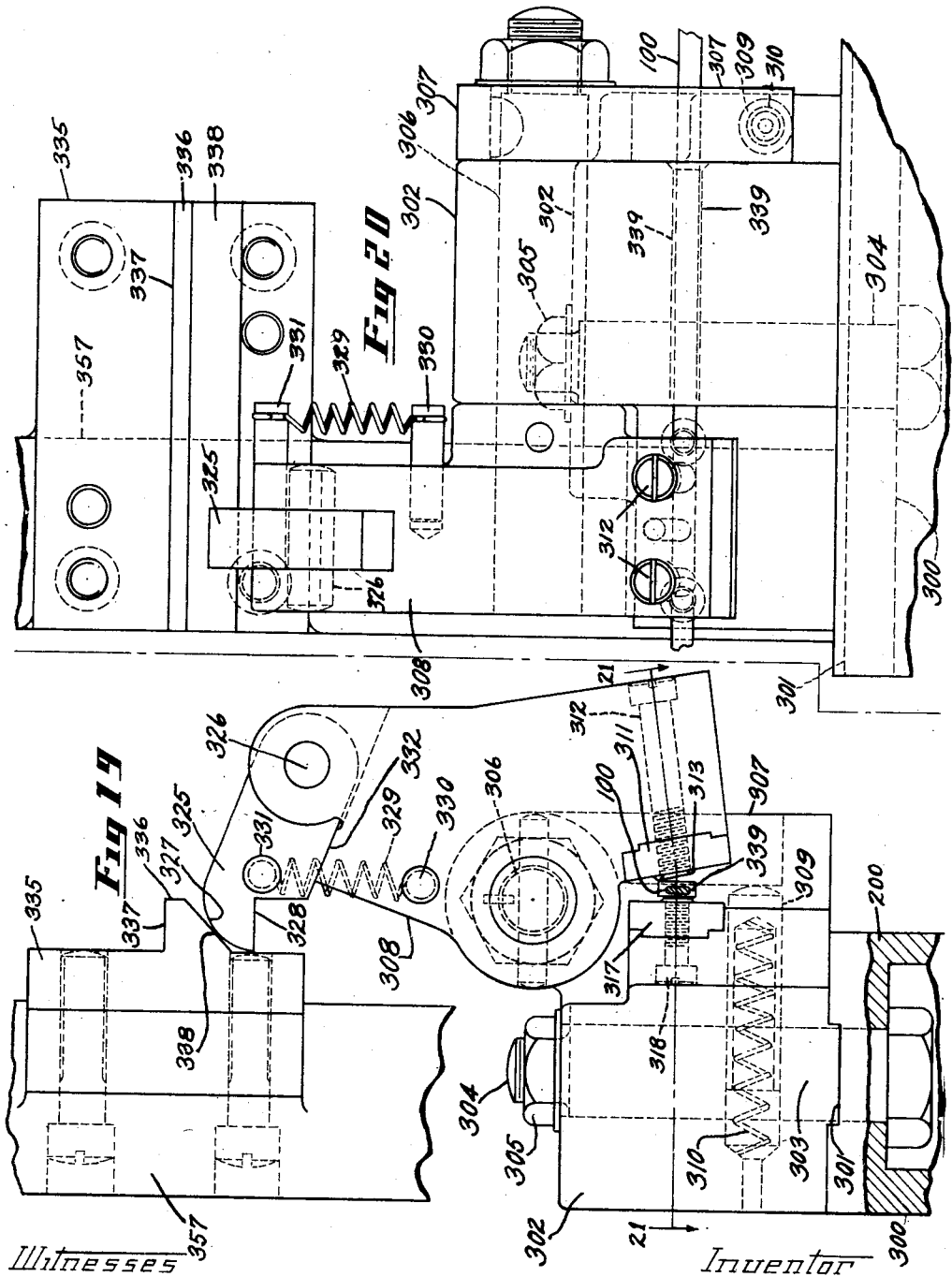

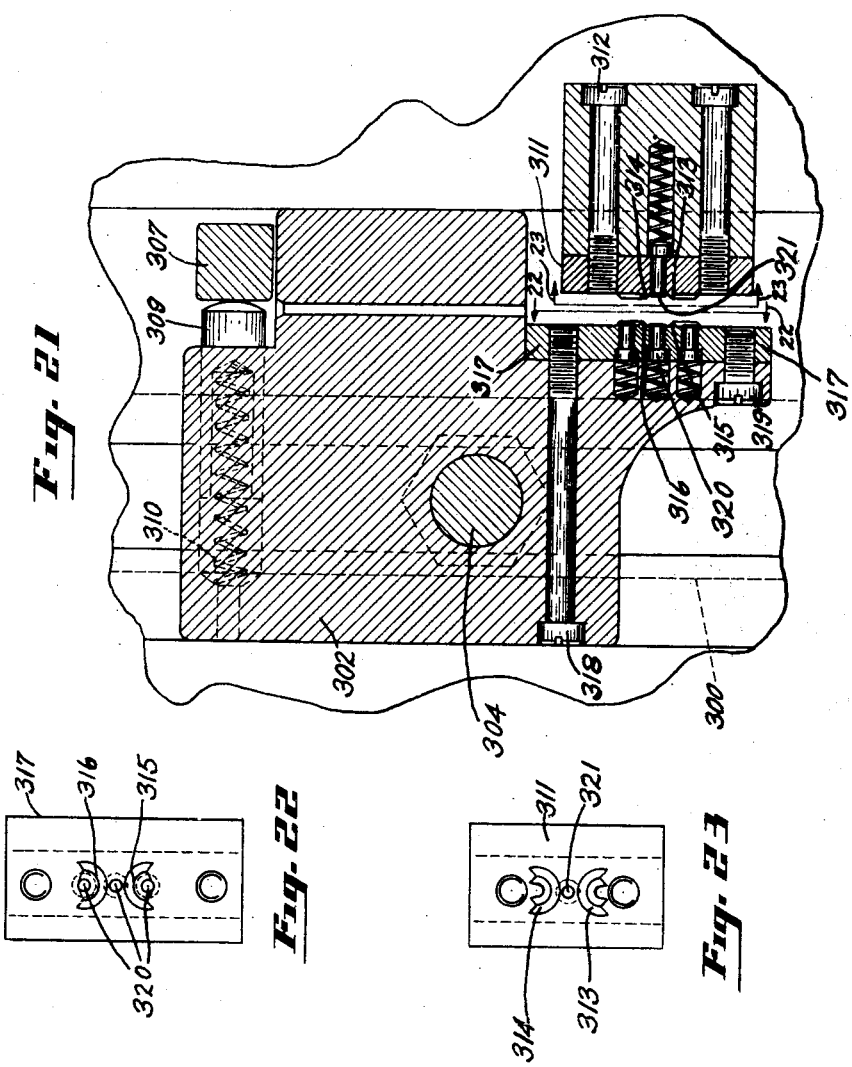

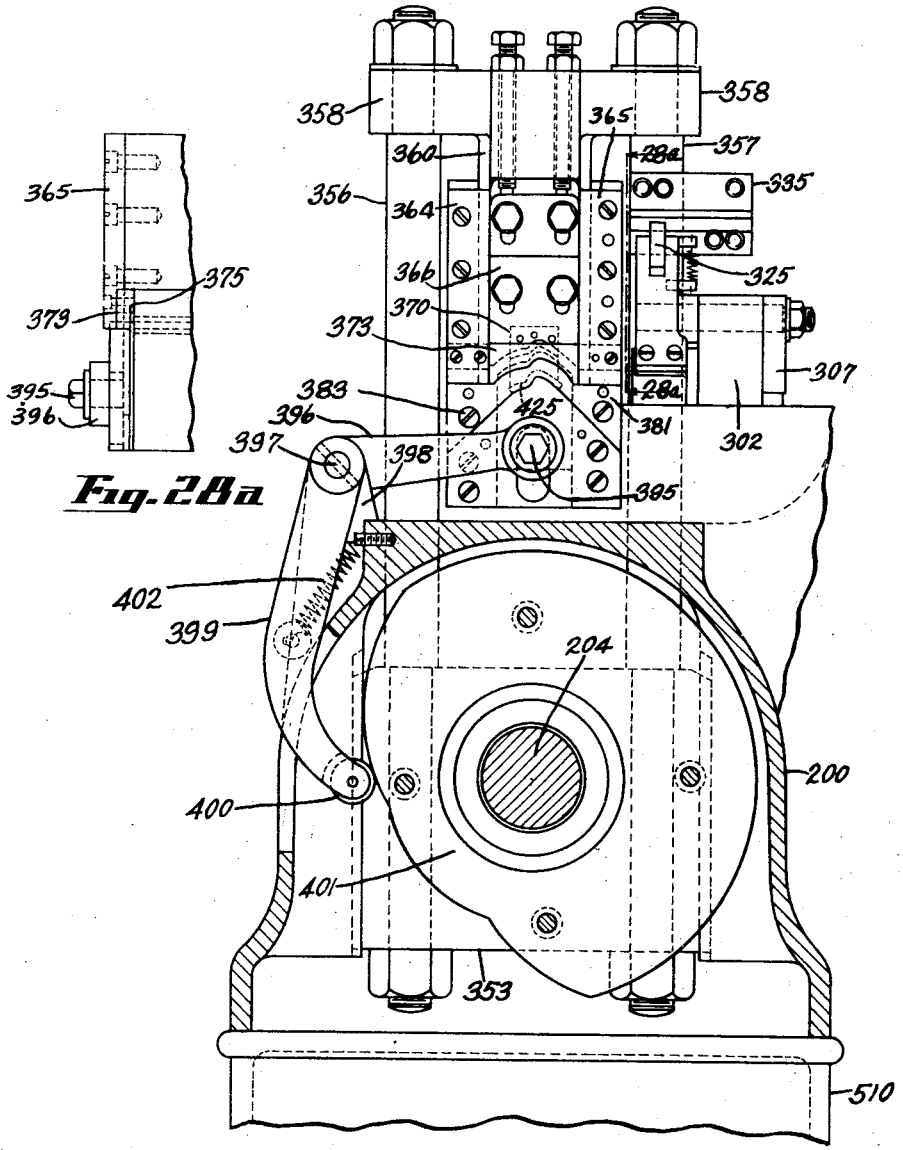

July 23, 1929. L. G. HAHN 1,721,623
METHOD AND MACHINE FOR MAKING ARMATURE CONDUCTORS
Original Filed April 5, 1923 22 Sheets-Sheet 18

Witnesses
Irvin A. Greenwald
Geo. E. Pasco

Inventor
Louis G. Hahn
By Joe W. Morrison
His Attorney

July 23, 1929.   L. G. HAHN   1,721,623
METHOD AND MACHINE FOR MAKING ARMATURE CONDUCTORS
Original Filed April 5, 1923   22 Sheets-Sheet 20
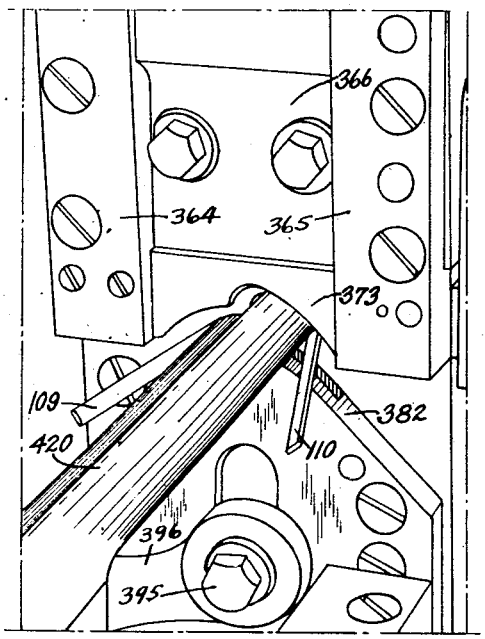
Fig. 37
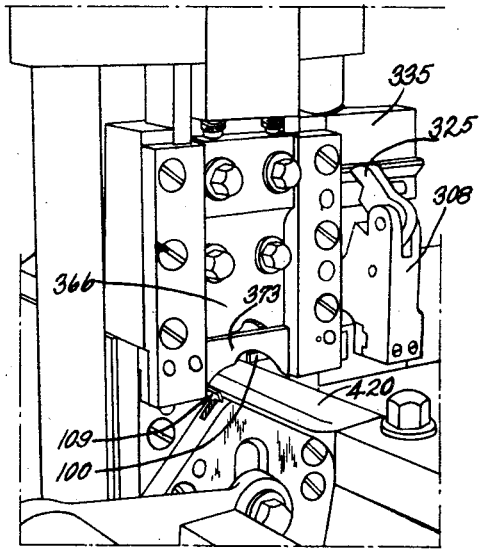
Fig. 38
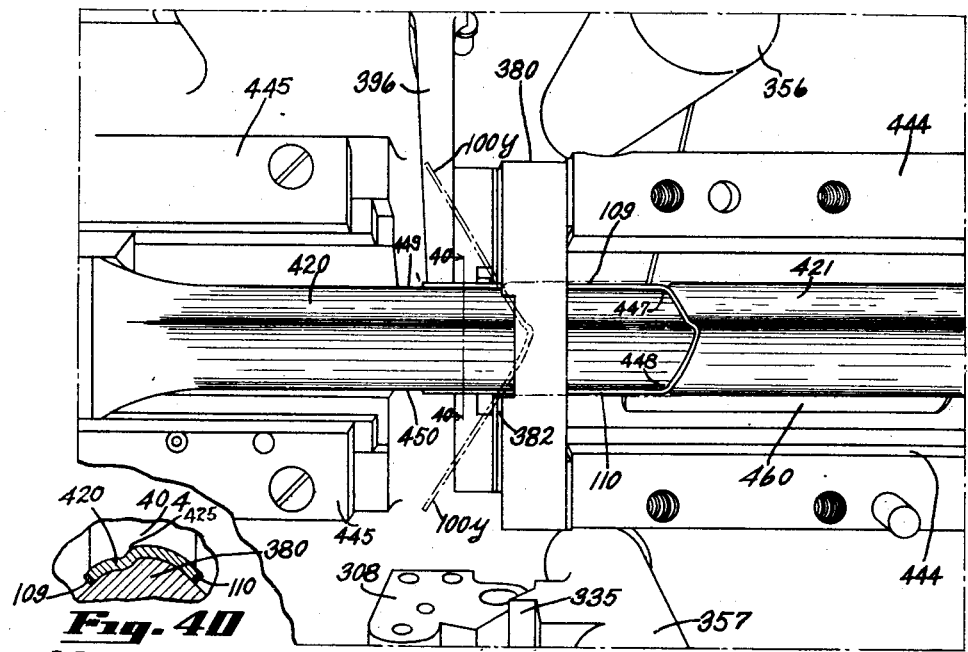
Fig. 40
Witnesses
Irvin A. Greenwald
Clarence Schmieding
Fig. 39
Inventor
Louis G. Hahn
By Joe W. Morrison
His Attorney July 23, 1929. L. G. HAHN 1,721,623
METHOD AND MACHINE FOR MAKING ARMATURE CONDUCTORS
Original Filed April 5, 1923 22 Sheets-Sheet 21
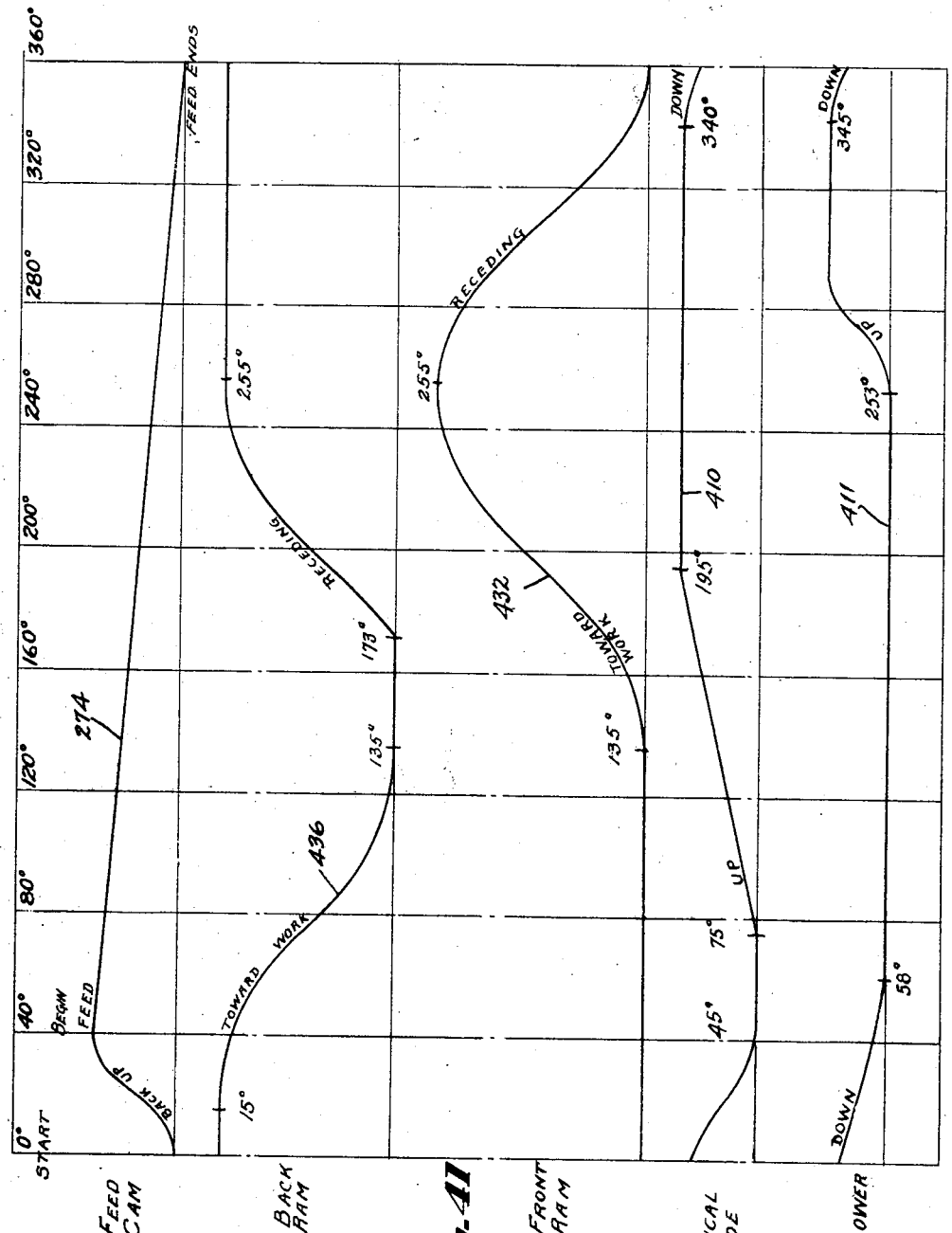

July 23, 1929. L. G. HAHN 1,721,623
METHOD AND MACHINE FOR MAKING ARMATURE CONDUCTORS
Original Filed April 5, 1923 22 Sheets-Sheet 22

Witnesses
Clarence Schmieding
Irvin A. Greenwald

Inventor
Louis G. Hahn
By Joe W. Morrison
His Attorney

Patented July 23, 1929.

1,721,623

UNITED STATES PATENT OFFICE.

LOUIS G. HAHN, OF DAYTON, OHIO, ASSIGNOR, BY MESNE ASSIGNMENTS, TO DELCO-REMY CORPORATION, OF DAYTON, OHIO, A CORPORATION OF DELAWARE.

METHOD AND MACHINE FOR MAKING ARMATURE CONDUCTORS.

Application filed April 5, 1923. Serial No. 630,140. Renewed June 1, 1925.

This invention relates to the manufacture of single turn bar windings for dynamo-electric-machines, and more particularly the type of bar winding commonly known as the "hairpin" conductor frequently used in relatively low voltage series motors. Hairpin conductors generally comprise two parallel legs or branches which are assembled in an armature core in spaced relation, the branches being joined by a yoke portion which extends across one end of the core.

One object of the present invention is to provide an improved process for making hairpin conductors from bar stock more rapidly, and with a greater degree of uniformity than heretofore, in order that the yoke portions of the hairpins when assembled on the core, will be substantially uniformly spaced, thereby permitting closer spacing without danger of short circuit. Therefore the quantity of material required for the hairpins can be reduced, and also the motor can be made shorter because less space at the end of the core is required for the yoke portions of the hairpins.

It is also an object to secure greater uniformity in the parallelism and spacing of the branches of the hairpins so that they may be readily assembled endwise through parallel and uniformly spaced slots or tunnels in the armature core.

A further object of the invention is to provide a machine for carrying out the various steps of the process automatically whereby hairpin conductors may be rapidly and uniformly made.

Other and further objects and advantages of the present invention will be apparent from the following description, reference being had to the accompanying drawings, wherein a preferred embodiment of the present invention is clearly shown.

In the drawings:

Figs. 1 and 2 together form a plan view of a machine embodying the present invention and adapted to carry out the process;

Figs. 3 and 4 together form a side view of the machine, Fig. 3 showing the left-hand or pulley wheel end;

Figs. 5 and 6 together form a side elevation of the machine taken from the opposite side thereof from Figs. 3 and 4;

Fig. 7 is an end view of the machine, looking toward the pulley wheel;

Fig. 8 is a partial longitudinal sectional view through the lower side of the flywheel, showing in section a flywheel brake;

Figs. 9 and 10 together form a longitudinal sectional view of the machine.

Figure 29:
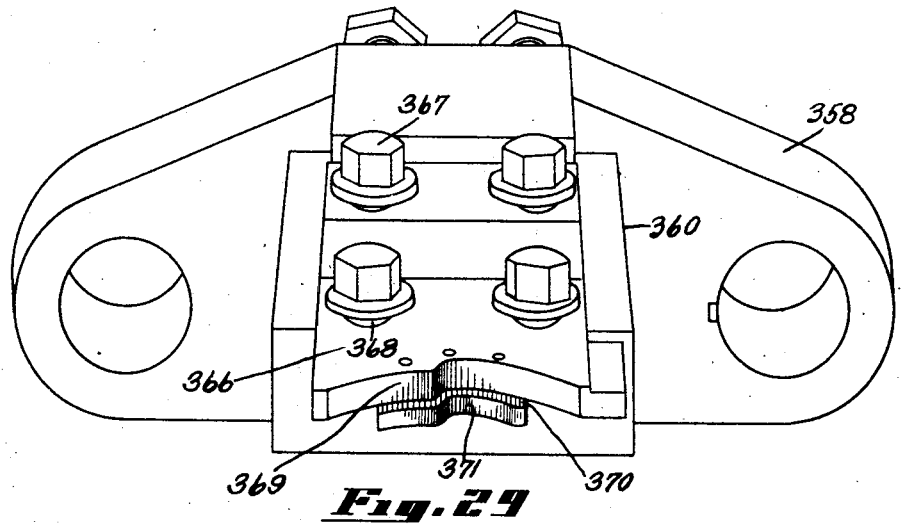
Figure 30:
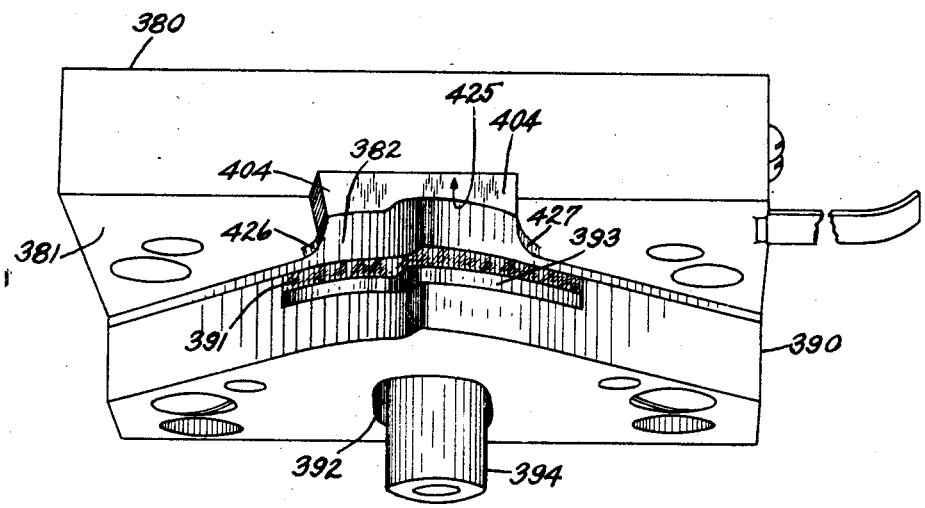
Figure 45:
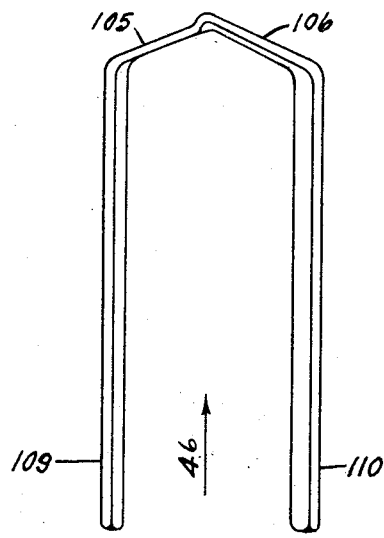
Figure 46:

Fig. 10ª is a fragmentary view, on an enlarged scale, of the dies shown in Fig. 10;

Fig. 11 is a transverse sectional view taken substantially on the line 11—11 of Fig. 10, showing a part of the bar shaping mechanism;

Fig. 12 is a transverse sectional view taken substantially on the line 12—12 of Fig. 10;

Fig. 13 is an enlarged sectional view taken substantially on the line 13—13 of Figs. 1 and 2, showing in detail the stock feeding mechanism;

Fig. 14 is another enlarged detail view of the feeding mechanism taken substantially on the line 14—14 of Fig. 13;

Fig. 15 is a transverse sectional view taken substantially on the line 15—15 of Fig. 1, showing in detail the driving mechanism for the grooved feeding wheel;

Figs. 16, 17, and 18 are further detail views of the feeding mechanism, these views being taken on the lines 16—16, 17—17, and 18—18, respectively, of Fig. 15;

Fig. 18ª is a detail section taken on the line 18ª—18ª of Fig. 13;

Fig. 19 is a side elevation of the stock shearing mechanism;

Fig. 20 is a front view thereof;

Fig. 21 is a sectional plan view taken substantially on the line 21—21 of Fig. 19, showing in section the dies for cutting and shaping the bar ends;

Figs. 22 and 23 are views taken substantially on the lines 22—22 and 23—23 of Fig. 21, showing in elevation the cutting and shaping dies;

Fig. 24 is a transverse sectional view taken substantially on the line 24—24 of Fig. 1, showing a part of the tool operating mechanism and the dies for coplanar-bending the bar;

Fig. 25 is a sectional plan view taken substantially on the line 25—25 of Fig. 24;

Fig. 26 is a sectional plan view of the die supports taken substantially on the line 26—26 of Fig. 24;

Fig. 27 is another sectional plan view taken substantially on the line 27—27 of Fig. 24 through a die support;

Fig. 28 is a transverse sectional view of the machine taken substantially on the line 28—28 of Fig. 5;

Fig. 28ª is a fragmentary view looking toward the plane of line 28ª—28ª of Fig. 28;

Fig. 29 is a perspective view of the upper die and its support;

Fig. 30 is a perspective view of the lower die and its support;

Figs. 31 to 39, inclusive, illustrate successive steps in the forming of a hairpin bar winding;

Fig. 40 is a sectional view taken on the line 40—40 of Fig. 39;

Fig. 41 is a cam diagram illustrating the relative positions of the camming surfaces during different stages of the operation;

Figs. 42 to 45, inclusive, are views of a length of bar stock showing various steps in the process carried out by the forming machine; and Fig. 46 is an end view looking in the direction of the arrow 46 in Fig. 45.

Process

Figure 43:
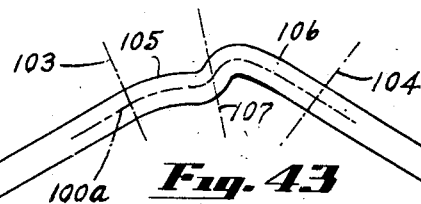
Figure 44:
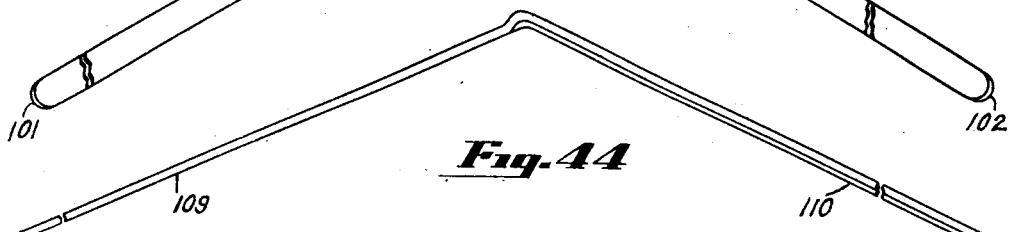

Referring to Figs. 42 to 46, inclusive, the process included in the present invention is as follows: A piece of bar stock 100 is severed from a supply roll, its length being sufficient to form a hairpin conductor. The ends 101 and 102 of the bar 100 are preferably rounded and beveled so as to facilitate inserting the hairpin into an armature core. The next step in the process is to bend an intermediate portion of the bar coplanar. The term "coplanar-bending" is intended to mean the bending of the stock so that all parts thereof may be located in a common plane; that is, the stock so bent may lie upon a plane surface with its parts resting upon such surface. This intermediate portion is that part of the bar between the dot and dash lines 103 and 104 in Fig. 43 and this portion is to form the yoke of the hairpin conductor when completed. As shown in Fig. 43, this yoke includes the offset portions 105 and 106 joined by an edgewise bend of double curvature. Thus far in the process, the axis of the bar stock, indicated by line 100ª, lies in one plane. The yoke portion and bar arms are laterally bent about the line 107, located substantially at the apex of the transverse part of the bar widening until the bar has a form substantially as shown in edgewise view in Fig. 44. Then the ends of the bar are bent laterally about the lines 103 and 104 to provide substantially parallel bar arms 109 and 110. The term "lateral-bending" is used to define the bending of portions of the stock away from the common plane occupied by the stock after being bent by the "coplanar-bending" operation. The result of this process is the formation of a hairpin having a yoke provided with offset portions 105 and 106. The axes 105ª and 106ª of these offset portions are preferably parts of concentric circles and the branches 109 and 110 lie substantially in radial planes indicated, respectively, by lines 111 and 112 which intersect in a line passing through the center of said concentric circles. This form of hairpin is adapted for endwise assembly into a rotor core, having radial slots or tunnels, with the arms 109 and 110 in spaced relation circumferentially and radially of the core. Each bar winding is placed in a core by moving its arms longitudinally into separate core slots.

The tools employed in carrying out this process include means for feeding bar stock, means for measuring a length of stock to form a complete bar winding, means for cutting off this length from a supply roll, a punch and die means for providing the coplanar bend in the yoke portion, and punch and die means for bending the stock laterally to provide the yoke with a V bend and to form the arms or branches of the hairpin conductor. In the description of the machine which follows, the various parts will be described in the order mentioned. Referring first to Figs. 3, 4, 5, 6, 9, and 10, the forming machine includes a frame 200 having bearings 201, 202, and 203 which support a main drive shaft 204 carrying at one end a flywheel pulley 205, intermediate of its length a cam drum 206, and at the other end a cam drum 207.

Bar stock feeding mechanism

The drum 207 carries cylindrical cam plates 208 and 209 having adjacent edges forming a cam race 210 for controlling the movements of a roller 211. Referring particularly to Figs. 4 and 13 to 18, inclusive, the roller 211 is carried on a sliding rack 212 mounted between two horizontally disposed gibs 213 and 214, the rack being retained in position by plates 215 and 216 secured to the frame 200 by screws 217. The rack 212 drives a segment 218 having a hub 219 supporting another segment 220. The hub 219 is mounted on a stub shaft 221 secured by pin 222 in an apertured boss 223 provided in the frame 200 (Fig. 7). The segment 220 drives a rack 224 slidably mounted in ways 225 and 226 (see Fig. 15). Rack 224 supports racks 227 and 228, these racks being provided with teeth extending toward each other (see Fig. 16). The racks 227 and 228 are attached to rack 224 by bolts 229. The rack 224 is held in position by gib plates 230 and 231 attached to the frame by screws 232.

Rack 227 drives pinion 233 attached to shaft 234 journalled in block 235 which is horizontally slidable across the ways 236 and 237 provided in frame 200. A ratchet wheel 238, having ratchet teeth 239, is loosely journaled upon the upper end of shaft 234 and is supported upon a bearing washer 240. The ratchet wheel 238 has ratchet teeth 242 on its inner surface 241. A feed roller 243 is attached to the wheel 238 by bolts 244. The roller is provided with a circumferential groove 245. The ratchet wheel 238 is retained in position by a washer 246 and a bolt 247. The head of shaft 234 is provided with a lateral recess 248 within which is slidably mounted a plunger 249 having teeth 250 cooperating with the teeth 242 of the ratchet wheel 238. A spring 251 presses the plunger toward the teeth of the ratchet wheel. The block 235 is provided with a vertical bore 252 for receiving a bushing 253 within which is slidably mounted a plunger 254 provided with teeth 255 for engaging the teeth 239 of the ratchet wheel 238, see particularly Fig. 17. Spring 256 presses the plunger 254 upwardly. A sleeve 257 is placed between the head of shaft 234 and the wheel 238 to form a bearing for the wheel 238. The bearing 257 is removable to permit removal of the wheel from the shaft.

The rack 228 drives a pinion 260 attached to a shaft 261 journalled in a block 262 which is similar to the block 235 described above. Block 262 is also slidably mounted in the ways 236 and 237. A ratchet wheel 263 having ratchet teeth 264 corresponding with the teeth 242 of the wheel 238 but pointing in the opposite direction (see Fig. 18ª), is loosely mounted on the head of shaft 261 and is supported by a bearing washer 240. The shaft 261 carries a spring pressed plunger 249ª having teeth 250ª cooperating with the teeth 264. Teeth 250ª point in the opposite direction from teeth 250 of plunger 249. The wheel 263 supports a feed roll 265 having a cylindrical flange 266 adapted to enter the groove 245 of the feed roll 243.

Means is provided for adjusting the spacing of the feed rolls 243 and 265 and for pressing the rolls toward each other as the bar stock 100 is fed through the space between the flange 266 and the groove 245. This means includes bolts 267 having threaded engagement with the block 262 and extending through the block 235 and springs 268 located between the head of each bolt 267 and the block 235. By turning the bolts 267, the tension on the springs 268 can be adjusted so that the pressure exerted by the feed rolls on the side of the bar stock can be adapted to bars of different thicknesses.

The feeding mechanism is adjustable with respect to the severing and forming mechanisms. The blocks 262 and 235 are movable horizontally as described above. Block 262 can be secured in various horizontal positions by a bolt 269 extending loosely through a slot 270 formed in the frame, the bolt having threaded engagement with the block 262.

Figure 6:
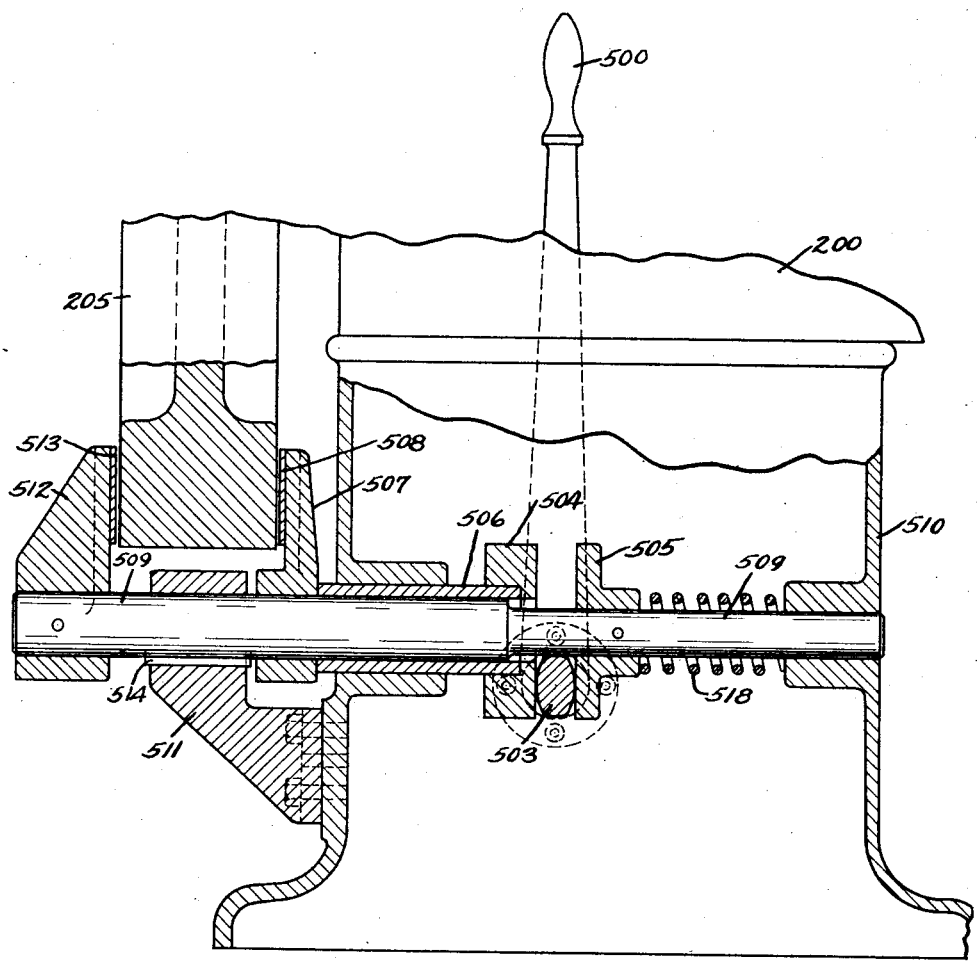

The operation of the feeding mechanism is as follows: The shaft 204 turns in a counterclockwise direction as viewed in Fig. 7. The part of the cam race 210 located above the axis of shaft 204 moves toward the observer, looking at Fig. 6, while the part of the race below the shaft 204 moves away from the observer. As the shaft 204 turns, the roller 211 will be moved from its position nearest the center of the machine, as shown in Fig. 6, to a position further from the center as shown in Figs. 4 and 13. This movement of the roller 211 will cause the rack 212 to move the segments 218 and 220 counterclockwise as viewed in Fig. 13 to the position shown in this figure, and the rack 224 will be moved toward the left, causing rack 227 to rotate the gear 233 clockwise as viewed from above in Fig. 16, and the rack 228 to move the gear 260 counterclockwise. Clockwise rotation of the ratchet wheel 238 is prevented by the engagement of the pawl 254 with the teeth 239 of gear 238. In Fig. 17, the direction of rotation of the gear 238 is indicated by an arrow 271. In Fig. 18, clockwise direction is indicated by an arrow 272 and in Fig. 18ª, the counterclockwise direction of shaft 261 is indicated by an arrow 273. During this rotation of the shafts 234 and 261, the pawls 249 and 249ª will back away from the internal ratchet teeth provided in the ratchet wheels 238 and 263, respectively. The rotation of the main drive shaft, acting through the intermediate mechanism described above, produces an intermittent rotation of the stock feeding rolls in a direction to move the stock into the bar forming devices.

Figure 31:
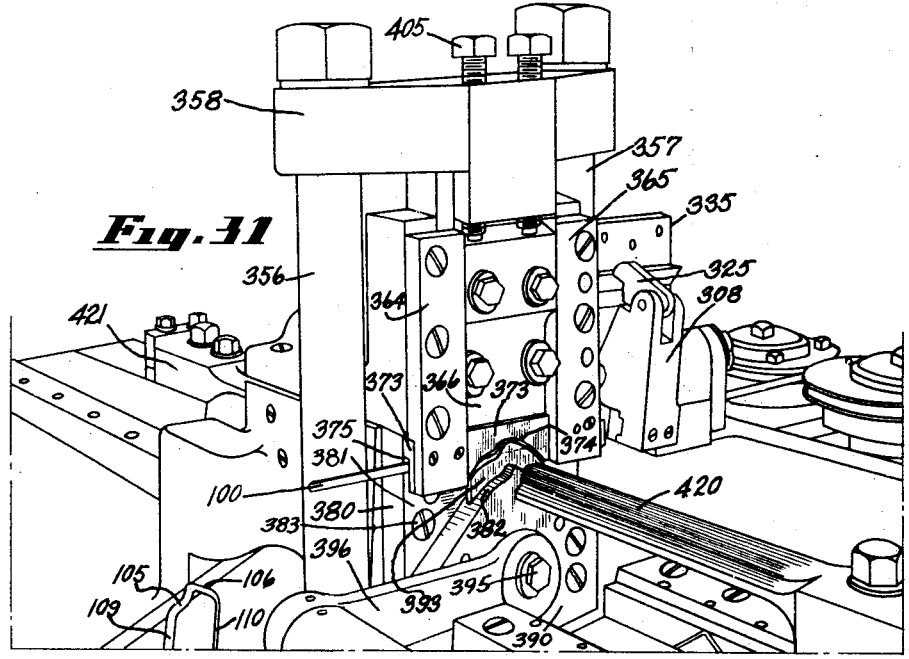

The motion of the feed mechanism which has just been described is called the "back up" motion. Referring to the cam chart, Fig. 41, the diagram of motion of the feed cam roller 211 is illustrated by the line 274. That portion of the line included between 0° and 40° of rotation of the feed cam, indicates motion of the feed roller away from the center of the machine or what is called the back up of the feed cam. During the remaining 320° of rotation of the feed cam, the feeding action takes place. As the feed cam continues to rotate, the roller 211 will be moved to the left as viewed in Fig. 13 or toward the center of the machine, thereby causing the shaft 234 to be rotated counterclockwise as viewed in Fig. 16 and the shaft 261 to be rotated clockwise. The pawls 249 and 249ª, with their respective ratchets 242 and 264, will rotate the feed rolls 243 and 265 counterclockwise and clockwise respectively, as viewed from above, thereby causing the bar stock to be fed toward the machine as indicated in Fig. 31. The travel of the cam roller 211 is so determined that when feed rolls of a certain diameter are used, the end of the bar stock will be moved to the left, as viewed in Fig. 31, a predetermined distance from the feed rolls and consequently a predetermined distance from the severing mechanism which will be described later.

Should it be desired to change the amount of stock fed during any one feeding operation, feed rolls having a different diameter can be substituted for those previously employed by removing the screws 244 and 247, permitting removal of one pair of feed rolls and the substitution of another pair of different diameter. The distance between the shafts 234 and 261 may be varied by loosening the bolt 269 and adjusting the blocks 235 and 262 horizontally and adjusting the screws 267. The springs 268 will cause the rolls to exert the necessary pressure upon the bar stock when passed between the feed rolls.

Bar stock severing mechanism

The mechanism for cutting off a length of stock is mounted on the machine inside the bar feeding mechanism (Fig. 7). Referring to Figs. 19 to 23 and Fig. 34, the machine frame 200 is provided with a transverse T-slot 300 and a transverse groove 301. A block 302 is formed with a tongue 303 seating in the groove 301. The block 302 is slidable across the machine frame and may be secured in adjusted position by a bolt 304 and a nut 305, the head of the bolt accupying the T-slot 300. The block 302 supports a shaft 306 carrying at its outer end a lever 307 and at its inner end a lever 308. The lever 307 is normally held in a retracted position by a plunger 309 slidably mounted within the block 302 and actuated by spring 310. Face block 311 is attached to the lower end of lever 308 by screws 312 and is formed with arcuate sharp edged projections 313 and 314 on its face. These projections are arranged to cooperate with similar projections 315 and 316 formed on block 317 attached by screws 318 and 319 to the block 302. Spring pressed plungers 320 extend through the block 317 and normally beyond the plane face of the block as shown in Fig. 21. A spring pressed plunger 321 extends through the block 311 and beyond the plane face thereof.

Lever 308 carries a pawl 325 pivoted at 326 and provided on the top side thereof with an arcuate surface 327 and on its lower side with a horizontal surface 328. A spring 329, connected with studs 330 and 331, normally holds the pawl 325 in engagement with a stop 332 formed on the lever 308.

The pawl 325 is actuated by a block 335 secured to a vertically reciprocated rod 357 which also operates a part of the bar shaping devices. The block 335 is provided with a projection 336 having a horizontal surface 337 adapted to engage surface 328 during upstroke of the rod 357, and with an oblique surface 338 adapted to engage arcuate surface 327 during down stroke of the rod.

The operation of the severing mechanism is as follows: The stock 100 is fed through an aperture 339, provided in the block 302, the feeding operation stops, and the block 335 descends, causing the inclined surface 338 to engage the arcuate surface 327 of pawl 325 and rotate the lever 308 clockwise as viewed in Fig. 19. The stock 100 is squeezed between the pairs of projections 313—315 and 314—316. These projections bite into the soft metal bar, which is preferably of copper, and cut out a short slug of material, leaving the ends of the stock rounded off and beveled as shown in Figs. 42 to 45. The plungers 320 and 321 remove the slugs from the severing mechanism.

During upward movement of the block 335, the projection 337 engages the surface 328 and lifts the pawl 325 without rotating the block 308 appreciably.

The width of the block 335 is sufficient to permit of considerable transverse adjustment of the block 302. Adjustment of the severing mechanism may be necessary whenever the length of stock delivered to the machine by the feeding mechanism is varied. The length of stock fed to the machine will be gaged according to the length of the legs of the hairpin conductor, and the length of one of these legs 110 is determined by the distance from the severing mechanism to the bending mechanisms. The length of leg 110 is varied by adjusting the severing mechanism with respect to the bending mechanism.

Coplanar-bending mechanism

Referring particularly to Figs. 4, 10, 24, and 28, the drum 207 carries at its inner end a box cam 350 having a race 351 for operating a follower roller 352 mounted on a block 353 vertically slidable within gibs 354 and 355 provided in the machine frame. The block 353 forms lower crosshead connecting rods 356 and 357. 358 is the upper crosshead. The rod 357 carries the block 335 for operating the severing mechanism as shown in Fig. 19. The block 358 is provided with a downwardly extending projection 360 movable vertically within ways 361 and 362 formed in a bracket 363 attached to the machine frame (Figs. 10 and 24). The slide 360 is confined within the ways by the cover plates 364 and 365. The upper coplanar-bending die member 366 is vertically adjustable, with respect to the projection 360, by means of bolts 367 passing through slots 368 in the die 366 and having threaded engagement with the slide 360. The upper die 366 is provided with a forming surface 369 conforming with the upper edge of the yoke portion of the bar when formed as shown in Fig. 43. The die 366 carries a back plate 370 (Fig. 10ᵃ), which assists in holding the bar in position during coplanar-bending, the lower surface 371 of this plate conforming substantially with the lower edge of the yoke portion as shown in Fig. 43.

373 is a front plate secured to stationary members 364 and 365 and spaced from back plate 370 to form a channel for guiding the stock when fed into the machine. The lower edge 374 of plate 373 is curved as shown in Figs. 24 and 31. Referring to Figs. 28ª and 31, it will be seen that the plate 373 is grooved at 375. The groove 375 is provided to guide the stock 100 between the plate 373 and the face 381 of the lower die member 380.

The die member 380 is provided with a forming surface 382 (Fig. 31) conforming with the lower edge of the edgewise bent yoke portions 105, 106 of the bar conductor as shown in Fig. 43. The lower die block 380 is attached to the machine frame by screws 383 and the upper die block 366 is adjusted with respect to the upper crosshead 358 so that in the lowest position of the upper die 366, it will be spaced the correct distance from the forming surface 382 of the lower die block 380. When the upper die 366 is correctly located, the surface 371 of the back plate 370 should clear the die surface 382.

A support 390, for vertically movable plate 393, is attached to the die block 380 and is provided with a vertically extending groove 391 (Figs. 24 and 30) and a vertical slot 392. When the support 390 and die block 380 are assembled as shown in Fig. 30, a recess is provided by the grove 391 between the blocks 380 and 390 for receiving and guiding the vertically slidable follower plate 393 provided with a hub 394. The plate 393 is atached by hub 394 and screw 395 to an arm 396 (Fig. 28) mounted upon a shaft 397 journalled upon a bracket 398 projecting from the machine frame. The shaft 397 also carries an arm 399 having a roller 400 cooperating with a cam 401 attached to the drum 206 (see also Fig. 9). The roller 400 is normally maintained in contact with the cam 401 by a spring 402 connecting the arm 399 with the machine frame (Fig. 28). The follower 393 is formed at its upper end with a surface conforming approximately with the shape of the surface 369 of upper die 366 (Fig. 24). The follower when in its uppermost position as shown in Fig. 10, provides a front retaining plate for the stock 100 while the back plate 370 forms the back retaining plate to prevent sidewise or lateral movement of the stock 100 while the coplanar-bending operation is performed. During this bending operation, the stock 100 is located across the face 381 of the lower die block 380. The back plate moves downwardly within a notch or recess 404 extending inwardly from the face 381 of die block 380 (Fig. 30). During the coplanar-bending operation, upward movement of the upper die 366 is resisted by the screws 405 which have threaded engagement with the head 358 (Fig. 31).

The operation of the coplanar-bending mechanism is as follows: Rotation of the cam 350, which is counterclockwise as viewed in Fig. 24, will cause the vertical slide 360 to move downwardly while the follower 393 is still in its upper position, shown in Fig. 10. Figs. 10, 24, 28, and 31 show the coplanar-bending mechanism in a position corresponding to the start or zero line position of the cam chart, Fig. 41. The line 410 indicates the movements of the vertical slide 360 and the line 411 indicates the movements of the follower 393. The vertical slide starts to move downwardly at 340° and the follower starts to move downardly at 345°. At 0° on the cam chart, these elements have moved but a small amount from their uppermost positions of vertical travel. (This zero or starting position of the shaft 204 has been chosen arbitrarily for purposes of explanation and is at the beginning of the "back up" movement of the feed cam represented by the line 274 in the chart.)

As the vertical slide 360 descends, the block 335 engages the pawl 325 to cause a length of bar stock to be severed from the supply strip prior to the coplanar-bending. The upper die 366 will engage the stock while it is confined between the follower 393 and the back plate 370, thereby causing the stock to be moved from the position 100 in Fig. 10ª to the position 100ˣ, and bending the stock around the surface 382 of the lower die block. The follower 393 follows the die 366 downwardly so that the stock 100 will be confined on one side by the follower while the stock is receiving the coplanar-bend. The follower 393 travels downwardly with the die 366 and to insure this, the die 366 overtakes the follower 393 and engages its upper edge and gives to the follower a downward motion independent of that normally produced by the follower cam 401. This operation moves the roller 400 away from cam 401, while the spring 402 holds the follower in engagement with the lower edge of the die 366.

Figure 34:
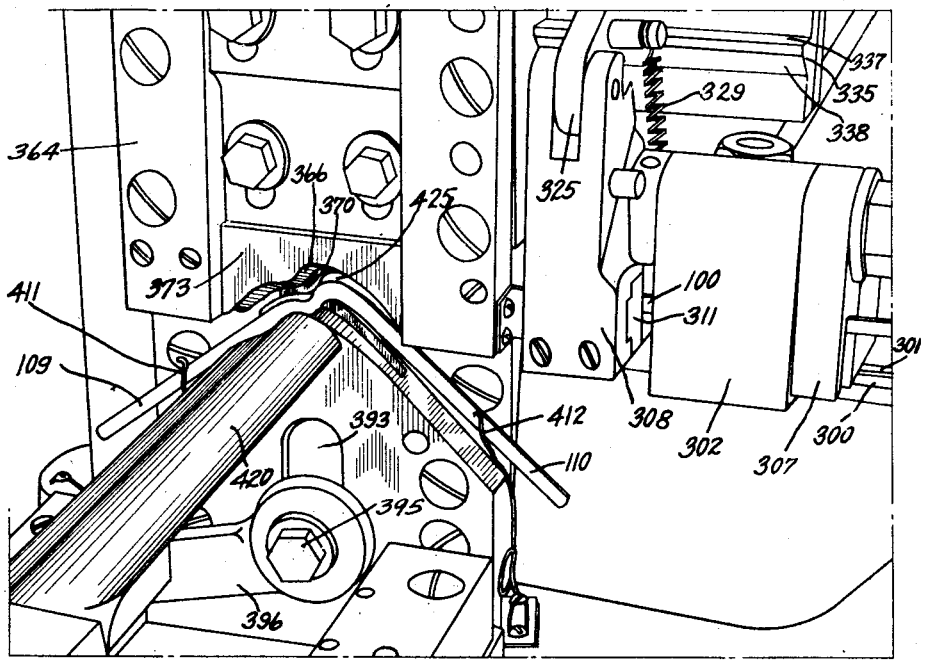

During this coplanar-bending operation, the parts 109 and 110 of the stock, which are later to form the branch portions or arms of the hairpin conductor, are moved into the position shown in Fig. 34 and are now clear of the lower edge of cross bar 373 and of the severing mechanism, and are engaged by the resilient fingers 411 and 412, respectively, which tend to retain the hairpin in vertical position for the subsequent lateral-bending operations after the upper die member recedes from the lower die member.

Figures 32, 33:
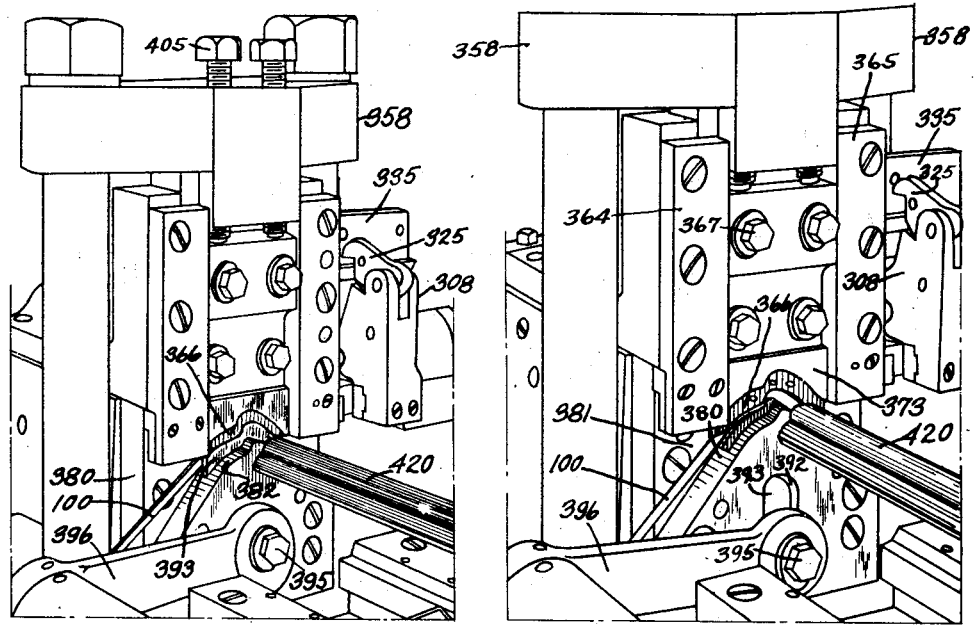

Fig. 32 shows the die 366 and follower 393 moving downwardly together and shows the parts when the operating shaft is turned about 20° from zero position. Fig. 33 shows the upper die 366 in its lowest position with the follower 393 moved downwardly away from in front of the work. Fig. 33 corresponds approximately with the 75° position shown in the chart in which the follower is in its lowest position and the die 366 is about to start upwardly. Fig. 34 shows die 366 removed from the work and this position corresponds to about 135° of movement with respect to the cam chart. In Fig. 34, the coplanar bending die has cleared the work sufficiently that the mechanism for bending the work laterally can now function.

Lateral bending mechanism

Referring particularly to Figs. 9, 10, and 34 to 40, the lateral bending mechanism includes a horizontally slidable front ram 420 and a horizontally slidable back ram 421 mounted upon ram blocks 422 and 423, respectively. The back ram 421 has substantially the same cross sectional shape as the front ram 420 but is wider than the front ram by an amount equal to twice the thickness of the bar stock. The opposed end surfaces of the rams are complementally shaped (Fig. 39) to conform to the opposite surfaces of the yoke portion of the hairpin, the ram 420 having a wedge shaped free end received in the V-shaped free end of the ram 421. Transverse sections of the ram are shaped to correspond to the shape of the yoke, see Figs. 11, 12, and 43. The lower die block 380 is provided with an aperture 425 providing a female die member which is shaped so as to permit the passage of both rams therethrough (Fig. 11), the shape of the aperture conforming closely to the shape of the cross section of the back ram 421, but slightly larger in dimensions so that the back ram may slide freely therethrough. Adjacent the aperture 425, the corners of the face 381 adjoining the recess 404 are rounded off as shown at 426 and 427 to assist in bending the arms of the hairpin into parallel positions.

The front ram block 422 carries a cam follower roller 428 (Fig. 9) located within a cam race 429 provided with the adjacent camming edges of plates 430 and 431 which are bolted to the drum 206. The adjacent edges of these plates are formed so as to provide a cam race which will produce movements of the front ram designated by the line 432 in the cam chart (Fig. 41). This chart shows that the front ram starts toward the work at 135° from zero position and that the ram recedes from the work at 255° and is back to the starting position at 360°.

The back cam block 423 carries a cam follower roller 433 cooperating with a cam race 434 provided by the adjacent edges of cylindrical cam plates 209 and 435. These adjacent edges are formed so that the back ram will start toward the work at 15° from zero, as indicated by the line 436 in the chart (Fig. 41). At 135°, the back ram will engage the work. At about 173°, the back ram will recede from the work and will travel in uniform relation with respect to the front ram, the work being carried between the rams, and will return to its initial position at 255°.

The ram blocks 422 and 423 are slidable within ways 442 and 443, respectively, provided in the machine frame, and the blocks are retained in position by cover plates 444 and 445, respectively.

Figures 35, 36:
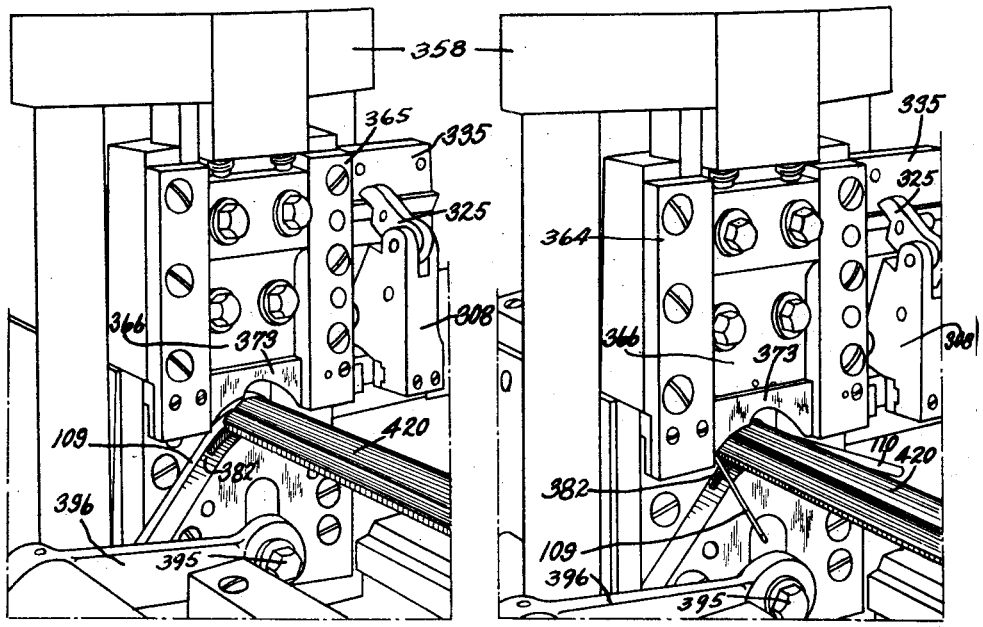
Figure 42:
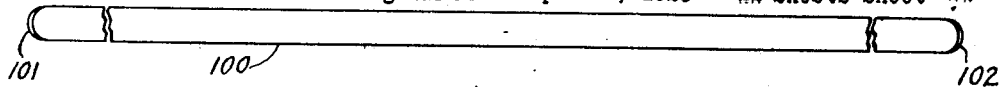

The operation of the lateral-bending mechanism is as follows: By the time that the coplanar-bending mechanism has receded from the work, this period in the operation of the machine being indicated by the 135° position in the chart, the back ram 421 will have traveled forward until the V notch has extended through the aperture 425 and is closely adjacent to the work. At 135°, the upper die member 366 is receding from the work, and the front ram starts toward the work. As the front ram continues its movement, it will engage the yoke portion of the bar, the point of the front ram engaging the work approximately at the line 107 indicated in Fig. 43, causing the yoke portion to be moved toward the V notch in the back ram and the work to be bent into the position shown in Fig. 44, this position being indicated by dot and dash line at 100$^v$ in Fig. 39. During this V bending operation, the back ram remains stationary while the front ram is moved toward it, thereby causing the work to be confined by the free end of the front ram within the V notch of the back ram. During this part of the operation, the yoke portion of the work is forced toward the aperture 425, the leg portions 109 and 110 being forced against the rounded edges 426 and 427 of the block 380. Fig. 35 shows relative positions of the mechanisms when the front ram engages the work.

At approximately 173°, the V bend along the axis 107 will be completed. Then the rams will both move to the right, as viewed in Fig. 39, with the yoke portion of the work clamped between their free ends. The cams controlling the rams are so constructed that during this phase of the operation, the rams move together, clamping the hairpin between them and carrying the completed hairpin away from the coplanar-bending mechanism. Figs. 36 and 37 show positions of the work after the front ram has entered the aperture 425 and both rams are moving to the right as viewed in Fig. 39. These rams seize the work by the yoke portion and force it through the aperture 425, thereby causing the two branches of the work to be bent about the corners 447 and 448 of the front ram and bringing the branches 109 and 110 into final positions against the parallel side surfaces 449 and 450 of the ram 420. These side surfaces are located in planes which are angularly disposed so that the legs 109 and 110 will be brought into the angular relation shown in Fig. 46. These branches of the hairpin are ironed into parallel relation by progressively pressing them in a direction toward their free ends between the edges or side surfaces of the front ram and the flat end walls of the aperture 425, as shown more particularly in Fig. 40. Fig. 38 shows the free end of the branch portion 109 as it is about to pass through the aperture 425.

Fig. 39 is a perspective view of the machine after certain parts have been removed to show the rams when in position for drawing the legs of the hairpin through the die 425.

The movement to the right of both rams continues until the 255° position is reached, at which time the front ram recedes from the back ram, releasing the yoke portion. The completed hairpin drops into a chute 460 which conducts the hairpin from the machine to a suitable receptacle.

During this movement of the back ram 421, its free end is supported by a block 461 having an aperture corresponding to a cross section of the ram. During the formation of the branches or legs, the work and the free ends of the rams are covered by a block 462 having a surface 463 shaped to conform with the upper surfaces of the rams.

Machine brake

Referring particularly to Figs. 3, 7, and 8, power is transmitted to the main drive shaft 204 through a belt (not shown) driving the pulley flywheel 205. When necessary to stop the machine quickly, either handle 500 or 501 is rotated in either direction, causing shaft 502, carrying cam 503, to separate the discs 504 and 505. Disc 504 is attached to a sleeve 506 bearing against a brake arm 507 carrying friction material 508. Disc 505 is pinned to a rod 509 slidably mounted in one of the pedestals 510 supporting the frame 200, and in a bracket 511 attached to this pedestal. Rod 509 carries a brake arm 512 provided with friction material 513. Separation of discs 504 and 505 causes the brakes 508 and 513 to bear against the flywheel 205 and retard movement of the flywheel. A key 514, supported by bracket 511, prevents turning of rod 509. A stud 515, carried by brake arm 507 and endwise movable through an aperture in bracket 511, prevents turning of arm 507. The brake arms 507 and 512 are returned to initial positions by springs 517 and 518, respectively.

Résumé of process

The operations performed on the bar stock to produce the hairpin illustrated in Fig. 45 are directed more particularly to the working of flat stock although the process may be carried out on round, square or other shaped bars. These bars, when coming into the machine in substantially straight lengths, must be bent in several planes at angles to each other, and this bending will tend to force different parts of the hairpin, and especially the long arms 109 and 110, into undesired positions, making it difficult to form an accurate hairpin and often necessitating added operations to straighten the bar winding. Accuracy is required in hairpin bar windings when a nest of the latter are grouped in close relation in an armature to facilitate assemblage of the bars in the armature and to promote compactness of structure which reduces the size and cost of the armature.

To obtain this accuracy, the steps of the process have been so ordered that the tendency toward an undesired deformation is reduced to a minimum and this is accomplished more especially by ordering the steps as follows: The bar is held against turning and is bent coplanar (preferably edgewise if the bar is oblong in cross section) to locate the vertex of the yoke, denoted roughly with the line 107 in Fig. 43, forming a V about the line 107, it being preferred to prevent sidewise movement of the arms during this bending operation. This also brings the lines 103 and 104 toward their final position in the hairpin winding. The partially formed bar has been bent coplanar; that is, its parts lie substantially in a common plane. Then the bar is bent between the lines 103 and 104 to complete the yoke portion, the legs 109 and 110 being held against curling or turning. Then the legs are bent about the lines 103 and 104 and turned into their proper radial positions with the flat surfaces non-parallel transversely of the bar.

This bending is effected by progressive operations, starting from the apex of the yoke and working toward the free ends of the hairpin, making the bends in one plane at each operation, stamping or ironing the parts into the desired formation by acting on a portion of the hairpin during each operation.

While the form of mechanism herein shown and described constitutes a preferred form of embodiment of the invention, it is to be understood that other forms might be adopted, all coming within the scope of the claims which follow.

What I claim is as follows:

1. In a machine for forming hairpin windings, the combination of means for shaping a portion of the bar in one direction; and means for clamping the said portion and for drawing it through said first-mentioned means in another direction for bending the bar and progressively ironing the end portions of the hairpin into parallelism.

2. In a machine of the class described, the combination of means for bending a portion of a bar in one direction; and a plurality of die members for progressively bending the bar in another plane and drawing said bar through the first-mentioned means whereby to form parallel branches.

3. In a machine of the class described, the combination of die members adapted to bend a bar in one direction; means for operating the said die members; other die members movable in another direction between the first die members to clamp the bar; and means for moving said second die members, with the bar clamped between them, relative to the first die members.

4. In a machine of the class described, the combination of die members adapted to bend a bar in one direction; means for operating the said die members; other die members movable in another direction to bend said bar in this other direction and operable after bending, to hold said bar clamped therebetween; and a member having an opening through which the second die members are movable, said member being constructed so that the walls, defining the opening, cooperate with one of the second die members to move the bar ends into parallelism.

5. In a machine of the class described, the combination of die members adapted to bend a bar in one direction; means for operating said die members; other die members movable in another direction to bend said bar in this other direction and operable after bending, to hold the bar clamped therebetween; a female die member; and means for moving the second die members with the bar clamped therebetween through said female die member, whereby the end walls of the female die member, cooperating with one of the second die members, will bend the unclamped ends of the bar into parallelism.

6. In a machine of the class described, the combination of die members adapted to bend a bar in one direction, one of said die members including an aperture forming a female die portion; means for operating said die members; other die members movable transversely to the first die members and through said aperture to bend the bar in this transverse direction, said other die members holding the bar clamped therebetween; and means for moving the said second die members with the bar clamped therebetween through said aperture, whereby one of said second die members cooperates with the female die portion to move the bar ends into parallelism.

7. In a machine of the class described, the combination of die members adapted to bend an intermediate portion of a flat bar coplanar, and to move the end portions of the bar toward each other, one of said coplanar-bending die members having an aperture to provide a female die member; other die members, one of which extends through the female die portion, adapted to bend the bar laterally and to move the said end portions nearer each other, said second die members being adapted, after so bending the bar, to clamp the bar therebetween; and means for moving the said second die members through the female die portion whereby the bar ends will be moved into parallelism.

8. In a hairpin forming machine, the combination of a drive shaft; cams operated by said shaft; a bar shaping mechanism automatically controlled by the cams and including a set of dies for coplanar bending a portion of a flat bar and then separating; a set of dies for thereafter bending the said portion laterally, and movable between said first-named dies; and means for holding th said bar portion clamped between the la named die members and for moving the l ter together for shaping the bar ends a then releasing the bar.

9. In a hairpin winding forming mach..e, the combination of a drive shaft; cams operated by said shaft; a bar shaping mechanism controlled by cams and including a set of dies for bending a portion of a bar in one plane and then separating; a set of dies for thereafter bending the bar in another plane to form the yoke portion and movable between said first-named dies; and means for progressively pressing the bar ends from the said yoke portion along surfaces of one of said last-named die members to form the parallel branches of the hairpin winding.

10. In a machine for forming hairpin conductors, the combination of a pair of relatively movable dies for bending an intermediate portion of a straight bar in one plane to produce the desired configuration of the hairpin yoke as it appears in the end view of the conductor; other die members having relative motion at right angles to the motion of one of said first mentioned dies and adapted to grip the formed intermediate portion of the bar and to produce the desired configuration of the hairpin yoke as it appears in the plan view of the conductor, and for forming the branches of the conductor; and mechanism for operating the dies in the order mentioned.

11. In a machine for forming hairpin conductors, the combination of a pair of relatively movable dies for bending an intermediate portion of a straight bar in one plane to produce the desired configuration of the hairpin yoke as it appears in the end view of the conductor; a pair of rams relatively movable at right angles to the motion of one of said dies and having cooperating end surfaces for gripping the formed intermediate portion of the bar and for producing the desired configuration of the hairpin yoke as it appears in the plan view of the conductor; a female die cooperating with one of the rams to form the branches of the conductor; and mechanism for producing relative movement of the dies and rams.

12. In a machine for forming hairpin conductors, the combination of a pair of relatively movable dies for bending an intermediate portion of a straight bar in one plane to produce the desired configuration of the hairpin yoke as it appears in the end view of the conductor; a pair of rams relatively movable at right angles to the motion of one of said dies and having cooperating end surfaces for gripping the formed intermediate portion of the bar and for producing the desired configuration of the hairpin yoke as it appears in the plan view of the conductor, one of said rams having parallel sides; and a female die for receiving the ram with parallel sides and the conductor while in contact with the ram, the opening in the female die being shaped to cause the end portions of the conductor to be pressed against the parallel sides of the ram in order to bring the end portions of the conductor into parallelism; and means for operating the dies and rams.

13. In a machine for forming hairpin conductors, the combination of a pair of relatively movable dies for bending an intermediate portion of a straight bar in one plane to produce the desired configuration of the hairpin yoke as it appears in the end view of the conductor; a pair of rams relatively movable at right angles to the motion of one of said dies and having cooperating end surfaces for gripping the formed intermediate portion of the bar and for producing the desired configuration of the hairpin yoke as it appears in the plan view of the conductor, one of said rams having parallel sides; and a female die having an opening through which the rams are movable with the conductor clamped between the ends of the rams, said opening being of a size such as to cause the end portions of the conductor to be pressed against said parallel sides as the rams and conductor pass through the female die; and means for operating the dies and rams.

14. The process of forming bar windings for armatures from a substantially straight bar, which comprises bending the bar in one plane to give it a V-shaped formation, then bending it in another plane to give it another V-shaped formation, then bending the bar to move portions of the oppositely disposed branches into parallelism.

15. The process of forming bar windings for armatures from a substantially straight bar, which comprises bending the bar in one plane to give it a V-shape having a reverse curve at its apex, then bending said bar in a plane at right angles to said first bend to give it another V-shape in the second plane, then bending the bar to move portions of the oppositely disposed branches into parallelism.

16. The process of bending a flat, substantially straight bar into a hairpin winding for armatures which comprises bending an intermediate portion of the bar coplanar while the bar ends are widely separated; bending the said portion laterally; and then bending the bar to form parallel branches.

17. The process of bending a flat, substantially straight bar into a hairpin winding for armatures which comprises bending an intermediate portion of the bar coplanar while the bar ends are widely separated; bending the said portion laterally while moving the bar ends toward each other; and then bending the bar to form parallel branches.

18. The process of making a single turn armature conductor which consists in bending an intermediate portion of a straight bar in one plane to produce the desired configuration of the hairpin yoke as it appears in the end view of the conductor, then bending said portion transversely to the plane of the first bending operation to produce the desired configuration of the hairpin yoke as it appears in the plan view of the conductor, the configuration of the yoke as it appears in the end view of the conductor remaining substantially unchanged, and bending the end portions of the bar relative to the yoke portion to provide the branches of the conductor.

19. Apparatus for forming hairpin conductors from bar stock comprising, in combination, coplanar-bending mechanism including die members one movable relative to the other; lateral-bending mechanism including two relatively movable die members which grip between them the stock bent by coplanar-bending mechanism and including a female die through which pass the first mentioned members of the lateral-bending mechanism and which cooperates therewith to bend the branches of the hairpin conductors against one of the movable die members of the lateral-bending mechanism, and means for actuating the bending mechanisms in succession.

20. Apparatus for forming hairpin conductors from bar stock, comprising in combination, means for bending the stock so as to provide an intermediate section including offset portions the axes of which approximately coincide with concentric arcs, the end sections extending in the same plane with the intermediate section and in diverging relation; means for bending each end section from the offset portion of the intermediate section which is contiguous therewith, whereby to provide a hairpin conductor having parallel branch portions adapted to be located upon an armature core at different distances from the axis of the core; and means for successively operating the bending means.

21. Apparatus for forming hairpin conductors comprising, in combination, mechanism for bending an intermediate portion of a piece of stock in one plane to produce the desired configuration of the hairpin yoke as it appears in the end view of the conductor; mechanism for bending said portions in a direction transverse to the first plane of bending to produce the desired configuration of the hairpin yoke as it appears in the plan view of the conductor; mechanism for providing the conductor with substantially parallel branches extending from the yoke and comprising a female die and a movable ram having an end portion for receiving the yoke and parallel sides, said ram forcing the hairpin conductor through the female die while the latter cooperates to force the branches of the conductor against the sides of the ram; and means for causing said mechanisms successively to bend the piece of stock.

22. Apparatus for forming hairpin conductors comprising, in combination, mechanism for bending an intermediate portion of a piece of stock in one plane to produce the desired configuration of the hairpin yoke as it appears in the end view of the conductor; mechanism for bending said portion in a direction transverse to the first plane of bending to produce the desired configuration of the hairpin yoke as it appears in the plan view of the conductor; and means for causing said mechanisms successively to bend the piece of stock.

23. Apparatus for forming hairpin conductors comprising, in combination, mechanism for bending an intermediate portion of a piece of stock in one plane to produce the desired configuration of the hairpin yoke as it appears in the end view of the conductor; mechanism for bending said portion in a direction transverse to the first plane of bending to produce the desired configuration of the hairpin yoke as it appears in the plan view of the conductor; mechanism for providing the conductor with substantially parallel branches extending from the yoke; and means for causing said mechanisms successively to bend the piece of stock.

In testimony whereof I hereto affix my signature.

LOUIS G. HAHN.